(12) United States Patent
Goto et al.

(10) Patent No.: US 11,975,787 B2
(45) Date of Patent: May 7, 2024

(54) CONTROL DEVICE FOR MOBILE BODY

(71) Applicant: HONDA MOTOR CO., LTD., Tokyo (JP)

(72) Inventors: Masaki Goto, Saitama (JP); Shinya Shirokura, Saitama (JP); Makoto Hasegawa, Saitama (JP); Kazumasa Ozaki, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 700 days.

(21) Appl. No.: 17/131,411

(22) Filed: Dec. 22, 2020

(65) Prior Publication Data

US 2021/0197918 A1 Jul. 1, 2021

(30) Foreign Application Priority Data

Dec. 25, 2019 (JP) ................. 2019-234133

(51) Int. Cl.
*G05D 1/02* (2020.01)
*B62J 45/415* (2020.01)
*B62K 11/00* (2006.01)

(52) U.S. Cl.
CPC ........... *B62K 11/007* (2016.11); *B62J 45/415* (2020.02)

(58) Field of Classification Search
CPC ......... B25J 13/088; B25J 5/00; B62K 11/007; B62J 45/415
See application file for complete search history.

(56) References Cited

U.S. PATENT DOCUMENTS

| 11,320,284 | B2* | 5/2022 | Hayee | B62D 15/025 |
| 11,505,183 | B2* | 11/2022 | Kim | B60W 30/095 |
| 2008/0129445 | A1 | 6/2008 | Kraimer et al. | |
| 2013/0297173 | A1 | 11/2013 | Takagi et al. | |

(Continued)

FOREIGN PATENT DOCUMENTS

| CN | 103299208 A | 9/2013 |
| CN | 103857550 A | 6/2014 |

(Continued)

OTHER PUBLICATIONS

Japanese Office Action dated Sep. 21, 2021, 2 pages.

(Continued)

*Primary Examiner* — Dalena Tran
(74) *Attorney, Agent, or Firm* — Rankin, Hill & Clark LLP

(57) ABSTRACT

The control device (20) corrects a basic movement command for a mobile body (1), which is based on an operator's maneuvering operation, in accordance with a positional relationship between the mobile body and an obstacle, and performs movement control of the mobile body (1) in accordance with the corrected movement command. The control device (20) is configured to correct the basic movement command, when a distance d between the obstacle and the mobile body (1) has become a predetermined value d1 or less, to cause a yaw rate in a direction away from the obstacle to be additionally generated on the mobile body (1), and also configured to correct the basic movement command so as to cause a rate of increase in magnitude of the yaw rate with respect to a decrease of the distance to be increased as the distance d is closer to the predetermined value d1.

8 Claims, 13 Drawing Sheets

(56) References Cited

U.S. PATENT DOCUMENTS

| | | |
|---|---|---|
| 2014/0277990 A1 | 9/2014 | Zambou |
| 2019/0047715 A1* | 2/2019 | Hedrick .................. G08G 5/04 |
| 2020/0216085 A1* | 7/2020 | Bobier-Tiu ........... B60W 40/08 |

FOREIGN PATENT DOCUMENTS

| | | |
|---|---|---|
| CN | 103959188 A | 7/2014 |
| CN | 107738644 A | 2/2018 |
| CN | 108275146 A | 7/2018 |
| JP | H07-110711 | 4/1995 |
| JP | 2005-293154 A | 10/2005 |
| JP | 2012-090409 A | 5/2012 |

OTHER PUBLICATIONS

Chinese Office Action dated Oct. 28, 2023 issued in corresponding Chinese application No. 202011548446.X; English machine translation included (22 pages).

* cited by examiner

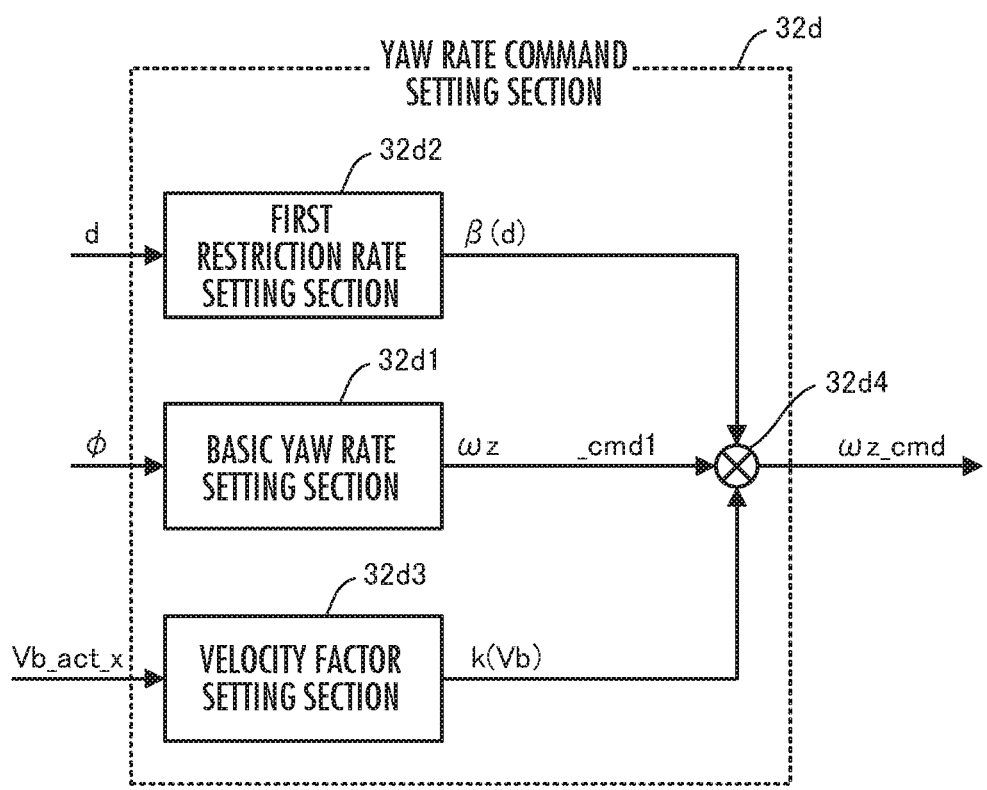

CONTROL DEVICE FOR MOBILE BODY

BACKGROUND OF THE INVENTION

1. Field of the Invention

The present invention relates to a control device for a mobile body which moves in accordance with a maneuvering operation by an operator.

2. Description of the Related Art

As a control device for a mobile body of this type, a device disclosed in Japanese Patent Application Laid-Open No. H07-110711 (hereinafter, referred to as "Patent Literature 1"), for example, is conventionally known. In this device, when a distance between the mobile body and an obstacle becomes a predetermined value or less while an operator is maneuvering the mobile body, a repulsive force and a frictional force are set. Then, in accordance with the repulsive and frictional forces, the device corrects the forward velocity and yaw rate of the mobile body from those according to the operator's maneuvering operation, thereby avoiding the mobile body coming into contact with the obstacle.

SUMMARY OF THE INVENTION

According to the technology described in Patent Literature 1, however, even if the distance between the mobile body and the obstacle has become the predetermined value or less, in a situation where the distance is close to the predetermined value, the repulsive force and the frictional force being set are small, hindering sufficient correction of the forward velocity and yaw rate of the mobile body immediately after the distance becomes the predetermined value or less. In such a case, the evasive action of the mobile body against the obstacle is likely to be delayed.

Further, in the case where the mobile body is a mobile body on which an operator boards, such as a wheelchair described in Patent Literature 1, immediately after the aforementioned distance has become the predetermined value or less, the moving operation of the mobile body would not likely be affected by the repulsive force or frictional force being set, making it difficult for the operator to sensitively recognize that the mobile body is too close to the obstacle. Accordingly, particularly in the case where virtual walls or other virtual obstacles are set up in the moving environment of the mobile body, the situation where the virtual obstacle and the mobile body come in excessively close is likely to occur frequently.

The present invention has been made in view of the foregoing background, with an object to provide a control device which when a mobile body is being moved in accordance with an operator's maneuvering operation, enables smooth movement of the mobile body while appropriately preventing the mobile body from coming too close to an obstacle.

In order to achieve the above object, a first mode of the control device for a mobile body according to the present invention is a control device for a mobile body which moves in accordance with a maneuvering operation by an operator, the device including:

a basic movement command generation unit configured to generate a basic movement command which is a movement command for the mobile body based on the maneuvering operation by the operator;

a movement command correction unit configured to correct the basic movement command according to a positional relationship between the mobile body and an obstacle present or set up in a moving environment of the mobile body; and a movement control unit configured to perform movement control of the mobile body according to a corrected movement command which is the basic movement command corrected by the movement command correction unit; wherein the movement command correction unit is configured to correct the basic movement command, in the case where a distance between the obstacle and the mobile body has become a first predetermined value or less, so as to cause a yaw rate in a direction away from the obstacle to be additionally generated on the mobile body, and configured to correct the basic movement command so as to cause a rate of increase in magnitude of the yaw rate with respect to a decrease of the distance to be increased as the distance is closer to the first predetermined value (a first aspect of the invention).

The "obstacle" in the present invention is not limited to an object that may actually contact the mobile body, but may be an obstacle (such as a virtual wall or other obstacle) virtually set up in the moving environment of the mobile body.

Further, in the present invention, the yaw rate to be "additionally generated" on the mobile body means a yaw rate by which the yaw rate to be generated by an actual motion of the mobile body is changed from the yaw rate generated by the motion of the mobile body defined according to the maneuvering operation by the operator (i.e., the yaw rate corresponding to the change from the yaw rate generated by the motion of the mobile body defined according to the maneuvering operation by the operator).

Further, the "rate of increase in magnitude of the yaw rate with respect to a decrease of the distance" means the amount of increase of the aforesaid yaw rate (the yaw rate to be additionally generated on the mobile body) per unit decrease in the distance between the obstacle and the mobile body.

According to the first aspect of the invention, in the case where the distance between the obstacle and the mobile body has become the first predetermined value or less, the basic movement command is corrected in such a manner that the rate of increase of the yaw rate (the yaw rate to be additionally generated on the mobile body in the direction in which the mobile body moves away from the obstacle) with respect to the decrease in the distance between the obstacle and the mobile body is increased as the distance is closer to the first predetermined value.

With this configuration, immediately after the distance has become the first predetermined value or less, the yaw rate generated on the mobile body can be increased promptly in the direction in which the mobile body moves away from the obstacle. Consequently, the mobile body is allowed to smoothly turn in the direction away from the obstacle immediately from after the distance has become the first predetermined value or less. This rapidly avoids further approach of the mobile body to the obstacle.

When the mobile body further approaches the obstacle, the rate of increase of the yaw rate decreases. This can suppress the change in behavior of the mobile body in a position close to the obstacle.

Accordingly, the first aspect of the invention enables smooth movement of the mobile body while appropriately preventing the mobile body from coming too close to an obstacle when the mobile body is being moved in accordance with the operator's maneuvering operation.

In the first aspect of the invention, the movement command correction unit is preferably configured to correct the basic movement command in such a manner that the yaw rate additionally generated on the mobile body changes according to the distance, a direction of the mobile body with respect to the obstacle, and a moving velocity of the mobile body (a second aspect of the invention).

With this configuration, the yaw rate to be additionally generated on the mobile body can be controlled by reflecting the distance between the obstacle and the mobile body, the direction of the mobile body with respect to the obstacle, and the moving velocity of the mobile body. This makes it possible to control the yaw rate so that the mobile body is effectively prevented from coming too close to the obstacle.

In the first or second aspect of the invention, it is preferable that the movement command correction unit is further configured to correct the basic movement command, in the case where the distance has become the first predetermined value or less, in such a manner that a moving velocity of a representative point of the mobile body is limited to a moving velocity having an absolute value smaller than a basic moving velocity which is a moving velocity defined according to the basic movement command, and configured to correct the basic movement command so as to cause a rate of increase in degree of restriction of the moving velocity with respect to a decrease of the distance to be increased as the distance is closer to the first predetermined value (a third aspect of the invention).

In the third aspect of the invention, the "degree of restriction of the moving velocity" of the mobile body means how large or small the magnitude of the difference between the basic moving velocity and the restricted moving velocity is relative to a certain reference value (e.g., the magnitude of the basic moving velocity).

Further, the "rate of increase in degree of restriction of the moving velocity with respect to a decrease of the distance" means the amount of increase in the degree of restriction of the moving velocity per unit decrease in the distance between the obstacle and the mobile body.

According to the third aspect of the invention, the basic movement command is corrected, in the case where the distance between the obstacle and the mobile body has become the first predetermined value or less, in such a manner that the rate of increase in degree of restriction of the moving velocity (the moving velocity of the representative point of the mobile body) with respect to a decrease of the distance between the mobile body and the obstacle is increased as the distance is closer to the first predetermined value.

This configuration makes it possible to promptly increase the degree of restriction of the moving velocity of the representative point of the mobile body immediately after the distance has become the first predetermined value or less. Consequently, the moving velocity of the representative point of the mobile body can promptly be decreased immediately from after the distance has become the first predetermined value or less. This rapidly suppresses further approach of the mobile body to the obstacle.

The rate of increase in the degree of restriction of the moving velocity decreases as the mobile body further approaches the obstacle. This can suppress the change in behavior of the mobile body in a position close to the obstacle.

In the third aspect of the invention, it is preferable that the movement command correction unit is configured, in the case where the distance has become the first predetermined value or less, to perform processing of setting a first restriction degree index value indicating the degree of restriction of the moving velocity according to the distance and processing of setting a second restriction degree index value indicating the degree of restriction of the moving velocity according to a direction of the mobile body with respect to the obstacle, and restrict the moving velocity of the representative point of the mobile body in accordance with the first restriction degree index value and the second restriction degree index value, and the movement command correction unit is also configured, in the case where the degree of restriction indicated by the second restriction degree index value which is set in the case where the distance is not greater than a second predetermined value which is smaller than the first predetermined value is defined as a degree A restriction and the degree of restriction indicated by the second restriction degree index value which is set in the case where the distance is greater than the second predetermined value is defined as a degree B restriction, to set the second restriction degree index value so as to cause the degree A restriction becomes greater than the degree B restriction in at least a part of a variable range of the direction of the mobile body (a fourth aspect of the invention).

In the fourth aspect of the invention, the "first restriction degree index value" means an index value which changes monotonically (increases or decreases monotonically) relative to the degree of restriction of the moving velocity according to the distance. The "second restriction degree index value" means an index value which changes monotonically (increases or decreases monotonically) relative to the degree of restriction of the moving velocity according to the direction of the mobile body with respect to the obstacle.

According to the fourth aspect of the invention, in at least a part of the variable range of the direction of the mobile body with respect to the obstacle, the degree A restriction becomes greater than the degree B restriction. Therefore, the second restriction degree index value can be set in such a manner that the degree of restriction of the moving velocity of the representative point of the mobile body is increased in a wider range of the direction of the mobile body in the case where the distance between the obstacle and the mobile body is the second predetermined value or less, as compared to the case where the distance is greater than the second predetermined value. This makes it possible to effectively prevent the mobile body from coming closer to the obstacle than the distance of the second predetermined value, over a wide range of direction of the mobile body.

A second mode of the control device for a mobile body according to the present invention is a control device for a mobile body which moves in accordance with a maneuvering operation by an operator, the device including:

a basic movement command generation unit configured to generate a basic movement command which is a movement command for the mobile body based on the maneuvering operation by the operator;

a movement command correction unit configured to correct the basic movement command according to a positional relationship between the mobile body and an obstacle present or set up in a moving environment of the mobile body; and a movement control unit configured to perform movement control of the mobile body according to a corrected movement command which is the basic movement command corrected; wherein the movement command correction unit is configured to correct the basic movement command, in the case where a distance between the obstacle and the mobile body has become a first predetermined value or less, so as to restrict a moving velocity of a representative point of the mobile body to a moving velocity having an absolute value smaller than a basic moving velocity which is a moving velocity defined according to the basic movement command, and configured to correct the basic movement command so as to cause a rate of increase in degree of restriction of the moving velocity with respect to a decrease of the distance is increased as the distance is closer to the first predetermined value (a fifth aspect of the invention).

In the fifth aspect of the invention, the "degree of restriction of the moving velocity" of the mobile body and the "rate of increase in degree of restriction of the moving velocity with respect to a decrease of the distance" have the same meanings as in the third aspect of the invention described above.

According to the fifth aspect of the invention, similarly as in the third aspect of the invention, it is possible to promptly increase the degree of restriction of the moving velocity of the representative point of the mobile body immediately after the distance between the obstacle and the mobile body has become the first predetermined value or less. Consequently, the moving velocity of the representative point of the mobile body can promptly be decreased immediately from after the distance has become the first predetermined value or less. This rapidly suppresses further approach of the mobile body to the obstacle.

The rate of increase in the degree of restriction of the moving velocity decreases as the mobile body further approaches the obstacle. This can suppress the change in behavior of the mobile body in a position close to the obstacle.

Accordingly, the fifth aspect of the invention enables smooth movement of the mobile body while appropriately preventing the mobile body from coming too close to an obstacle when the mobile body is being moved in accordance with the operator's maneuvering operation.

In the fifth aspect of the invention, the movement command correction unit may adopt the similar manner as in the fourth aspect of the invention (a sixth aspect of the invention). This makes it possible to achieve the similar effects as those achieved by the fourth aspect of the invention.

The control device for the mobile body according to the first through fourth aspects of the invention is appropriate to the case where the mobile body is a boarding-type mobile body having a boarding section on which the operator boards (a seventh aspect of the invention). Similarly, the control device for the mobile body according to the fifth and sixth aspects of the invention is appropriate to the case where the mobile body is a boarding-type mobile body having a boarding section on which the operator boards (an eighth aspect of the invention). That is, in the boarding-type mobile body, immediately after the distance between the obstacle and the mobile body has become tire first predetermined value or less, the mobile body is caused to turn in the direction away from the obstacle or its velocity is reduced promptly. This allows the operator to sensitively and readily recognize that the mobile body has come too close to the obstacle, irrespective of whether the obstacle is a real one or a virtual one. Accordingly, the operator is able to rapidly perform maneuvering the mobile body so as to avoid further approach to the obstacle.

BRIEF DESCRIPTION OF THE DRAWINGS

FIG. 14 is a block-and-line diagram showing processing by the yaw rate command setting section shown in FIG. 4;

DESCRIPTION OF THE PREFERRED EMBODIMENTS

Figure 1:
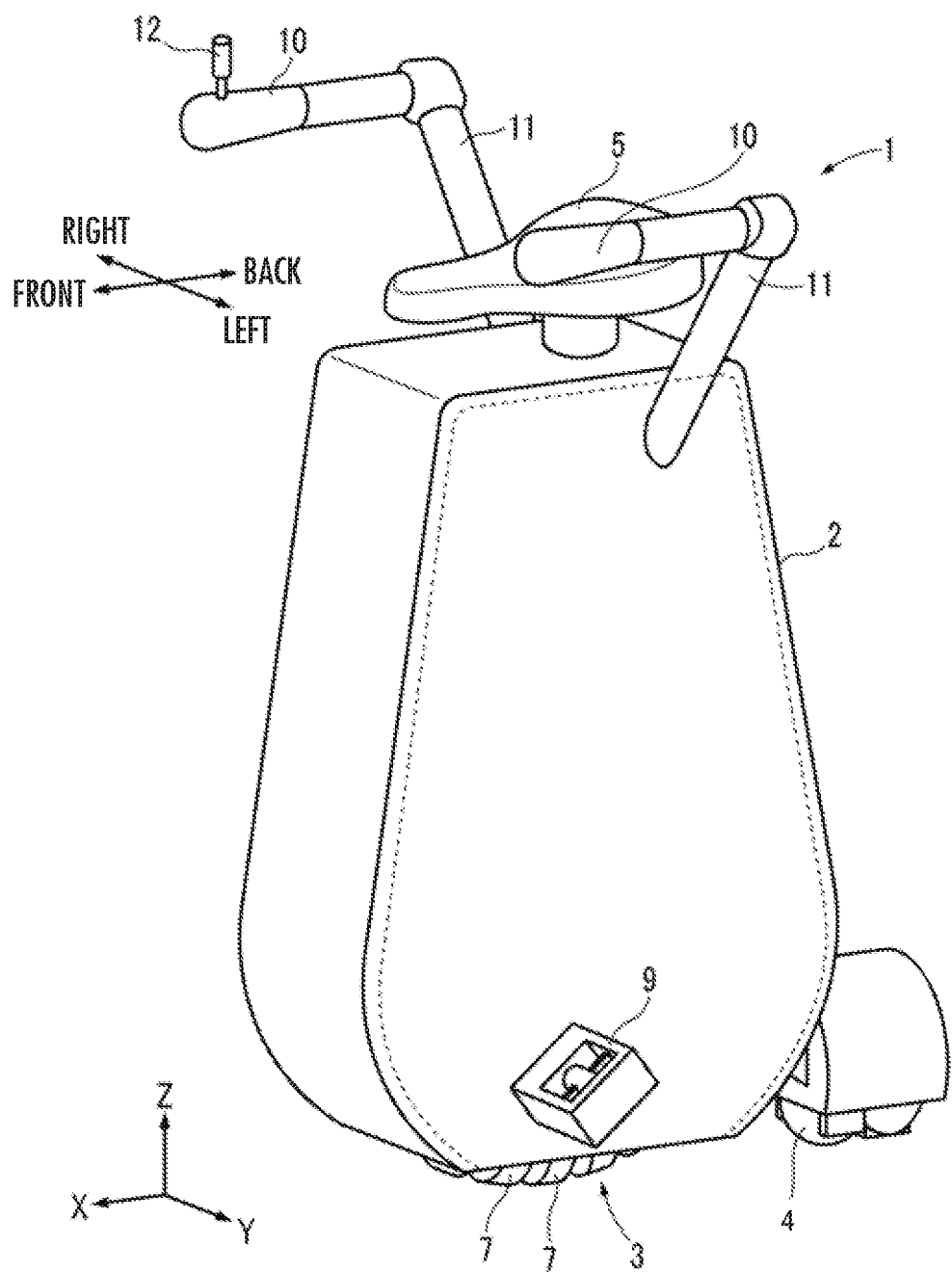
FIG. 1 is a perspective view of an inverted pendulum type vehicle as a mobile body of an embodiment of the present invention.
Figure 2:
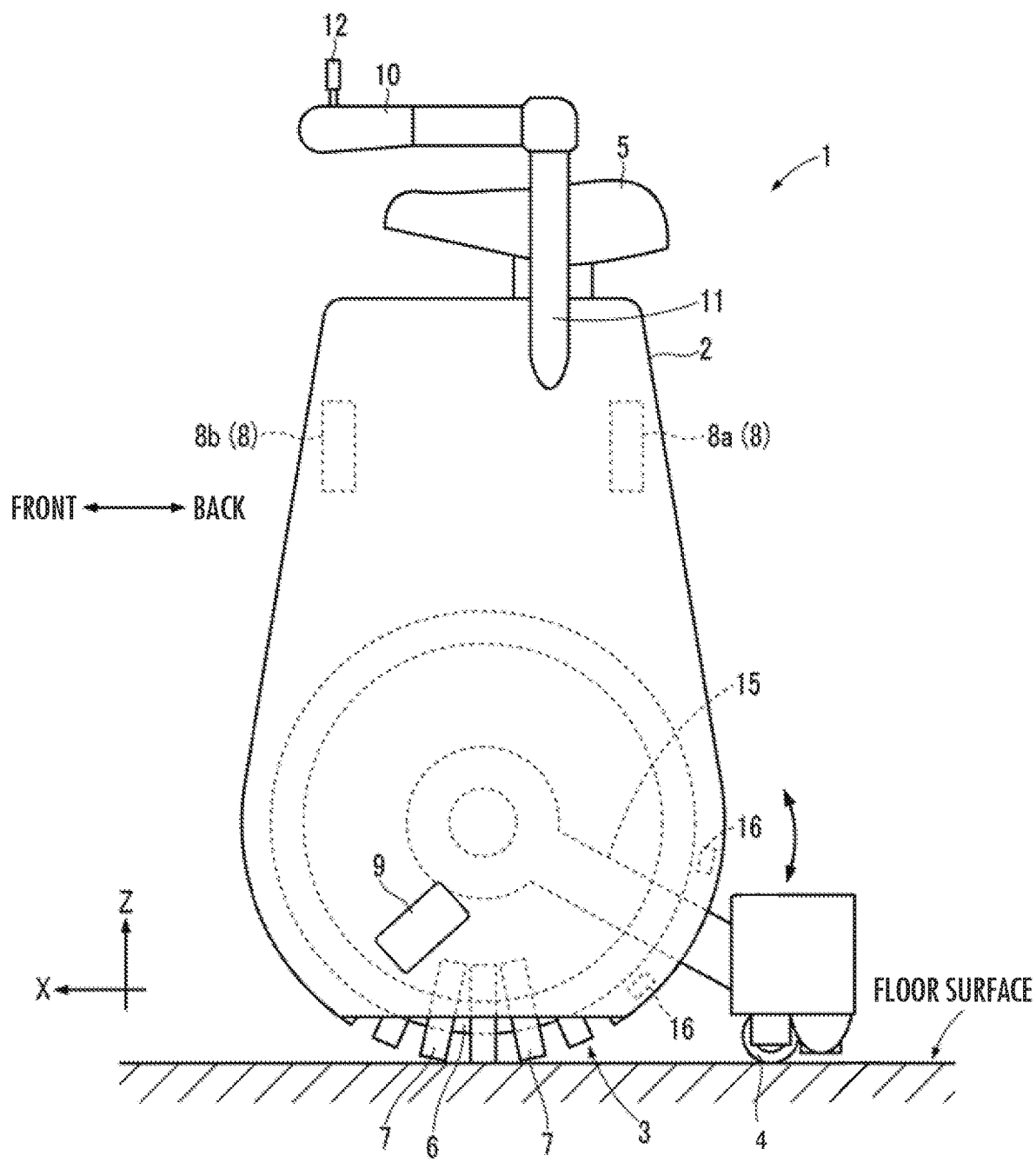
FIG. 2 is a side view of the inverted pendulum type vehicle of the embodiment.

An embodiment of the present invention will be described below with reference to FIGS. 1 to 15B. As shown in FIGS. 1 and 2, a mobile body 1 of the present embodiment is, for example, an inverted pendulum type vehicle as a boarding type mobile body. In the following description of the present embodiment, the mobile body 1 will be referred to as the vehicle 1. The vehicle 1 includes a base body 2, a traveling motion unit 3 capable of moving in all directions on a floor surface, a tail wheel 4 arranged at a rearward of the traveling motion unit 3, and a boarding section 5 on which an operator of the vehicle 1 boards. It should be noted that the "floor surface" may be, not limited to the floor surface in the ordinary sense, a ground surface, road surface, or the like.

In the present embodiment, the traveling motion unit 3 is a wheel-like traveling motion unit as disclosed in Japanese Patent Application Laid-Open No. 2015-093651, for example. The configuration of the traveling motion unit 3 will be described schematically. The traveling motion unit 3 includes a core body 6 of a ring shape (hereinafter, referred to as "annular core body 6") shown in FIG. 2, and a plurality of ring-shaped rollers 7 mounted on the annular core body 6 so as to be arranged at equal angular intervals in the circumferential direction (the direction about the shaft center) of the annular core body 6, with the rollers 7 located at the lower end portion being in contact with the floor surface.

Rotatively driving one or both of the annular core body 6 and the rollers 7 enables the traveling motion unit 3 to move in all directions on the floor surface. The configuration of such a traveling motion unit 3 is described in detail in Japanese Patent Application Laid-Open No. 2015-093651 and others, so detailed description thereof will be omitted herein.

In the following description, a three-axis orthogonal coordinate system is assumed, as shown in FIGS. 1 and 2, with the longitudinal direction of the vehicle 1 being the X-axis direction, the lateral direction of the vehicle 1 being the Y-axis direction, and the up-and-down direction (vertical or substantially vertical direction) being the Z-axis direction. The X-axis direction, the Y-axis direction, and the Z-axis direction refer to the coordinate axis directions of this coordinate system, unless otherwise specified. In this case, the X-axis direction (the longitudinal direction of the vehicle 1) is the direction in which the traveling motion unit 3 rolls when the annular core body 6 of the traveling motion unit 3 in the state of standing on the floor surface is rotatively driven, and the Y-axis direction (the lateral direction of the vehicle 1) is the direction of the shaft center of the annular core body 6 of the traveling motion unit 3 in the upright state. It should be noted that the positive direction of the X-axis is the forward direction of the vehicle 1, the positive direction of the Y-axis is the left direction of the vehicle 1, and the positive direction of the Z-axis is the upward direction. The direction about the X-axis, the direction about the Y-axis, and the direction about the Z-axis are called the roll direction, the pitch direction, and the yaw direction, respectively.

The base body 2 has the traveling motion unit 3 assembled thereto. The base body 2 is arranged to cover the periphery of the traveling motion unit 3 excluding the lower portion thereof that is in contact with the floor surface. The base body 2 supports the annular core body 6 of the traveling motion unit 3 so as to be rotatable about the shaft center thereof. In this case, the base body 2 is freely tiltable in the pitch direction, with the shaft center of the annular core body 6 of the traveling motion unit 3 as a fulcrum. The base body 2 is also freely tiltable in the roll direction by tilting together with the traveling motion unit 3 with respect to the floor surface, with the ground contact portion of the traveling motion unit 3 as a fulcrum.

The base body 2 has an actuator 8 mounted therein, which generates a driving force to move the traveling motion unit 3. The actuator 8 is composed of an electric motor 8*a* serving as an actuator that rotatively drives the annular core body 6, and an electric motor 8*b* serving as an actuator that rotatively drives the rollers 7. The electric motors 8*a* and 8*b* apply the rotary driving force to the annular core body 6 and the rollers 7, respectively, via a power transmission mechanism (not shown). For the power transmission mechanism, one having the known structure described in Japanese Patent Application Laid-Open No. 2015-093651 and others, for example, may be adopted.

It should be noted that the traveling motion unit 3 may have a structure different from the above-described structure. For example, as the structures of the traveling motion unit 3 and the driving system thereof, the structures described in PCT Unexamined International Application WO/2008/132778 or PCT Unexamined International Application WO/2008/132779 may be adopted.

The base body 2 also has the boarding section 5 assembled thereto, on which an operator boards. The boarding section 5 is composed of a seat for the operator to sit astride, and is secured to the upper end portion of the base body 2 so as to be tiltable integrally with the base body 2.

The base body 2 further has assembled thereto a pair of foot-resting sections 9, 9 for the operator seated on the boarding section 5 to place his/her feet thereon, and a pair of grasping sections 10, 10 for the operator to hold. The foot-resting sections 9, 9 are provided protrusively in the lower portion on both sides of the base body 2. In FIGS. 1 and 2, the foot-resting section 9 on one side (i.e. the right side) is not illustrated.

The grasping sections 10, 10, which are of bar shape, are arranged on both sides of the boarding section 5 to extend in the X-axis direction (the longitudinal direction). The grasping sections 10, 10 are each secured to the base body 2 via a rod 11 extended from the base body 2. On one of the grasping sections 10, 10 (in the figure, the grasping section 10 on the right side), a joystick 12 serving as an operating device for a maneuvering operation of the vehicle 1 is attached so that it can be swung in the pitch and roll directions.

The tail wheel 4 is composed of, for example, an Omni-Wheel (registered trademark), free caster, or the like, and is connected to the base body 2 or the traveling motion unit 3 via an arm 15. The arm 15 has its distal end axially supported by the base body 2 or the traveling motion unit 3 so as to be capable of swinging about the shaft center of the annular core body 6 of the traveling motion unit 3. The arm 15 is extended rearward of the base body 2. The arm 15 can swing within a range between stoppers 16, 16 provided on the base body 2. The tail wheel 4 is attached to the rear end of the arm 15 such that the tail wheel 4 comes into contact with a floor surface at the rearward of the traveling motion unit 3 and is capable of moving or turning on the floor surface according to the movement of the traveling motion unit 3. It should be noted that the tail wheel 4 may be urged by a spring or the like in a direction to be pressed against the floor surface.

Figure 3:
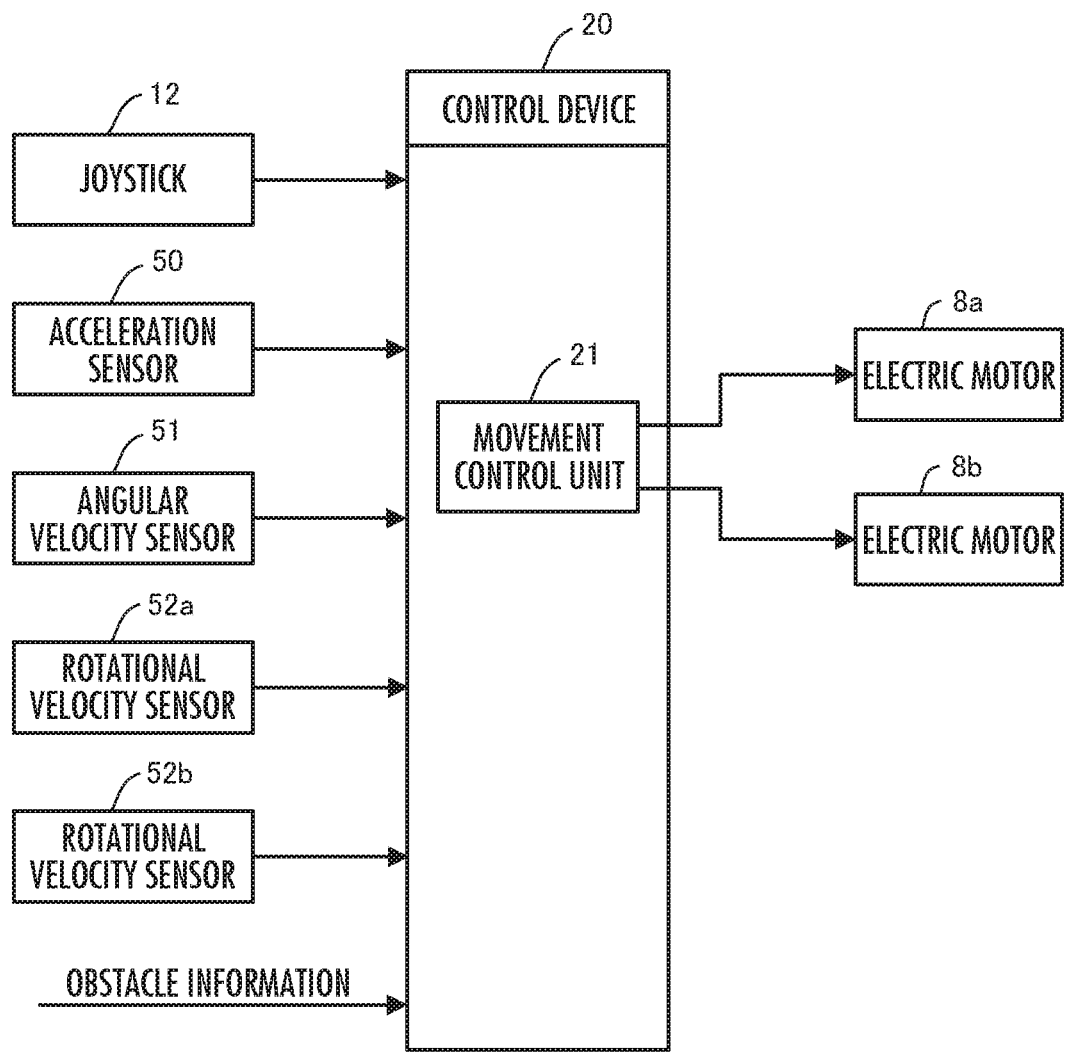
FIG. 3 is a block diagram showing a configuration concerning the control of the inverted pendulum type vehicle of the embodiment.

Although not shown in FIGS. 1 and 2, the base body 2 of the vehicle 1 according to the present embodiment includes, as a configuration for the motion control of the vehicle 1 (for the movement control of the traveling motion unit 3), as shown in FIG. 3, a control device 20, an acceleration sensor 50 which detects accelerations in three axis directions of the base body 2, an angular velocity sensor 51 which detects angular velocities about the three axes, a rotational velocity sensor 52*a* which detects a rotational velocity of the electric motor 8*a*, and a rotational velocity sensor 52*b* which detects a rotational velocity of the electric motor 8*b*. The rotational velocity sensors 52*a* and 52*b* may be composed of, for example, rotary encoders, resolvers, or the like.

The control device 20 may be composed of, for example, at least one electronic circuit unit which includes a microcomputer or processor, memory, interface circuit, etc. The control device 20 receives outputs (operation signals) of the joystick 12, and detection signals of the acceleration sensor 50, the angular velocity sensor 51, and the rotational velocity sensors 52*a* and 52*b*. The control device 20 is capable of communicating wirelessly with an external server (not shown) or the like.

The control device 20 has, as a function realized by one or both of the implemented hardware configuration and program (software configuration), a function of measuring a self-position of the vehicle 1 using a known inertial navigation technique such as a strapdown system from the detection signals of the acceleration sensor 50 and the angular velocity sensor 51 as the inertial sensors, and a function of measuring a tilt angle of the base body 2 (=tilt angle of the boarding section 5).

It should be noted that in the self-position measuring processing of the vehicle 1, not limited to the inertial navigation technique, a global navigation satellite system (GNSS) may be used, for example. Alternatively, detection information of an external sensor (camera, distance measurement sensor) or the like mounted on the vehicle 1 and/or information picked up by cameras installed in the moving environment of the vehicle 1 may be used. The processing of measuring the position of the vehicle 1 may be performed in an external server.

The control device 20 is capable of communicating with an external server to obtain obstacle information indicating a position of an obstacle present around the vehicle 1 from the server. The obstacle is not limited to an object (static object or moving object) that may actually contact the vehicle 1; the obstacle may be a virtual barrier (virtual wall) or other virtual obstacle which is virtually set up at, for example, the boundary of an entry prohibited area of the vehicle 1. The obstacle information may be recognized by the control device 20 itself by using, for example, the detection information of the external sensor (camera, distance measurement sensor) or the like mounted on the vehicle 1 and/or the information picked up by the cameras installed in the moving environment of the vehicle 1.

The control device 20 also has a function as a movement control unit 21 which controls the moving operation of the traveling motion unit 3 by controlling the electric motors 8a and 8b constituting the actuators 8. The movement control unit 21 performs arithmetic processing, which will be described later, to sequentially calculate a desired velocity, which is a desired value of the moving velocity (more specifically, a set of translational velocity in the X-axis direction and translational velocity in the Y-axis direction) of the traveling motion unit 3. The movement control unit 21 also determines desired values of rotational velocities of the electric motors 8a and 8b so as to cause an actual moving velocity of the traveling motion unit 3 to coincide with the desired velocity. The movement control unit 21 then performs feedback control of the rotational velocities of the electric motors 8a, 8b to the desired values defined in accordance with the desired velocity of the traveling motion unit 3, thereby controlling the actual moving velocity of the traveling motion unit 3 to coincide with the desired velocity.

Figure 4:
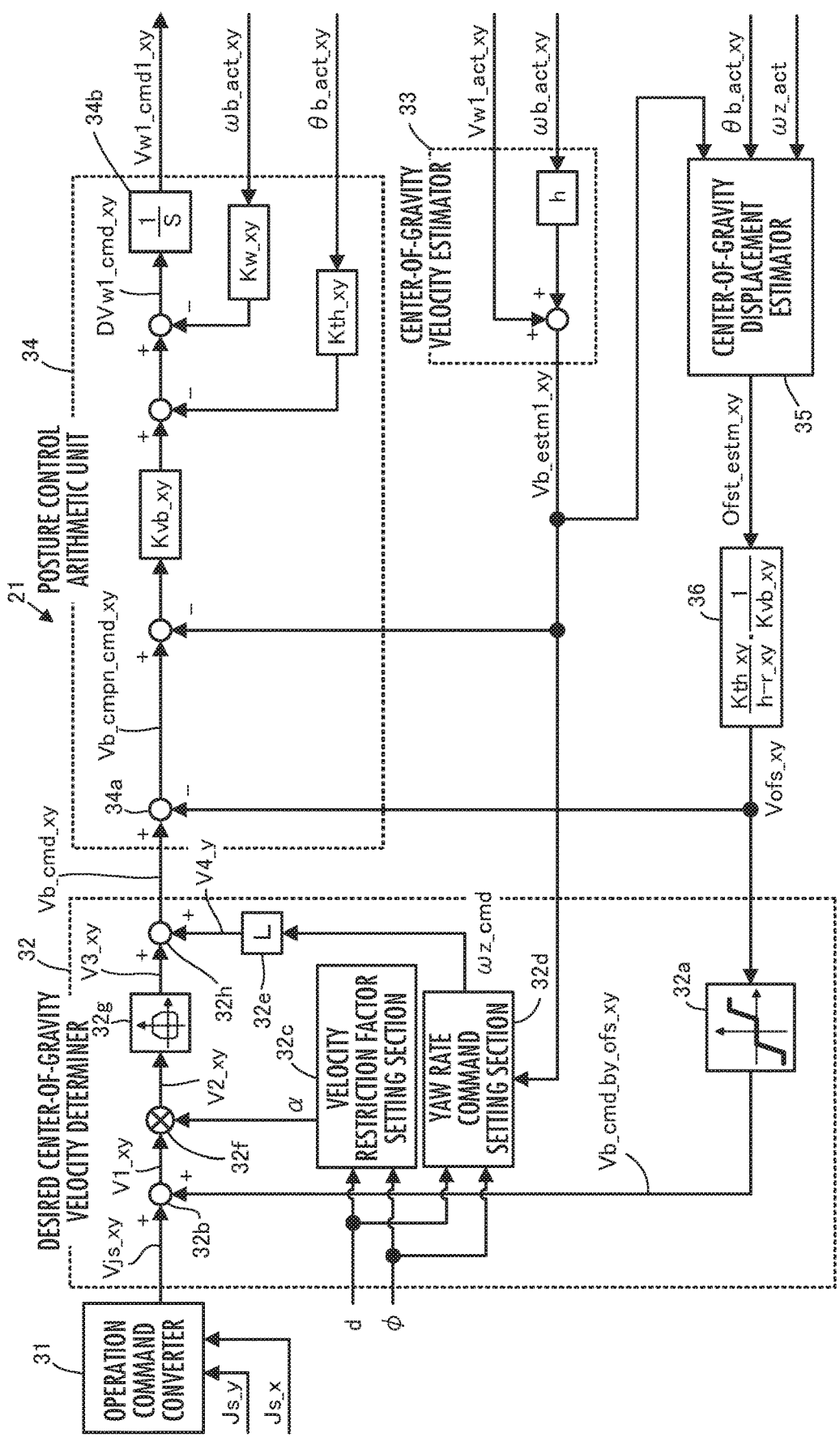
FIG. 4 is a block-and-line diagram showing processing by an essential part of a movement control unit shown in FIG. 3.

The processing performed by the movement control unit 21 will be described below in further detail. As shown in FIG. 4, the movement control unit 21 includes, as its major functional units, an operation command converter 31 which converts a set of a swing amount in the longitudinal direction (a rotational amount in the pitch direction) $Js\_x$ and a swing amount in the lateral direction (a rotational amount in the roll direction) $Js\_y$ of the joystick 12, indicated by the operation signals input from the joystick 12, into a velocity command for the movement of the vehicle 1, a desired center-of-gravity velocity determiner 32 which determines a desired velocity $Vb\_cmd\_xy$ of the overall center of gravity of the vehicle 1 (hereinafter, referred to as "vehicle system overall center of gravity"), a center-of-gravity velocity estimator 33 which estimates an actual velocity $Vb$ of the vehicle system overall center of gravity, a posture control arithmetic unit 34 which determines a desired velocity $Vw1\_cmd\_xy$ of the traveling motion unit 3 so as to stabilize the posture of the boarding section 5 (the posture of the base body 2) while making the velocity $Vb$ of the vehicle system overall center of gravity follow the desired velocity $Vb\_cmd\_xy$, a center-of-gravity displacement estimator 35 which estimates a center-of-gravity displacement amount $Ofst\_xy$, which will be described later, of the vehicle system overall center of gravity, and a center-of-gravity displacement influence amount calculator 36 which calculates a center-of-gravity displacement influence amount $Vofs\_xy$, which will be described later, which is attributable to the center-of-gravity displacement amount $Ofst\_xy$.

It should be noted that in the present embodiment, the velocity of the vehicle system overall center of gravity corresponds to the "moving velocity of a representative point of the mobile body" in the present invention, and the desired velocity $Vb\_cmd\_xy$ of the vehicle system overall center of gravity corresponds to the movement command in the present invention. The desired center-of-gravity velocity determiner 32 has the functions as the basic movement command generation unit and the movement command correction unit in the present invention.

The movement control unit 21 sequentially performs the processing by these functional units at a predetermined arithmetic processing cycle, to thereby determine the desired velocity $Vw1\_cmd\_xy$ of the traveling motion unit 3. It should be noted that in the description of the present embodiment, stabilizing the posture of the boarding section 5 (the posture of the base body 2) means to balance the vehicle system overall center of gravity like an inverted pendulum mass point.

In the description of the present embodiment, a reference character with a suffix "_x" added thereto means a state quantity or parameter concerning the behavior of the vehicle 1 when the vehicle 1 is observed from the Y-axis direction (observed as projected on a ZX plane), and a reference character with a suffix "_y" added thereto means a state quantity or parameter concerning the behavior of the vehicle 1 when the vehicle 1 is observed from the X-axis direction (observed as projected on a YZ plane).

Further, a reference character with a suffix "_xy" added thereto means a set of the state quantity or parameter when the vehicle 1 is observed from the X-axis direction and the state quantity or parameter when the vehicle 1 is observed from the Y-axis direction. For example, a desired velocity $Vw1\_cmd\_xy$ of the traveling motion unit 3 means a set of a desired velocity $Vw1\_cmd\_x$ of the traveling motion unit 3 when the vehicle 1 is observed from the Y-axis direction (i.e., the desired velocity in the X-axis direction) and a desired velocity $Vw1\_cmd\_y$ of the traveling motion unit 3 when the vehicle 1 is observed from the X-axis direction (i.e., the desired velocity in the Y-axis direction).

Figure 5:
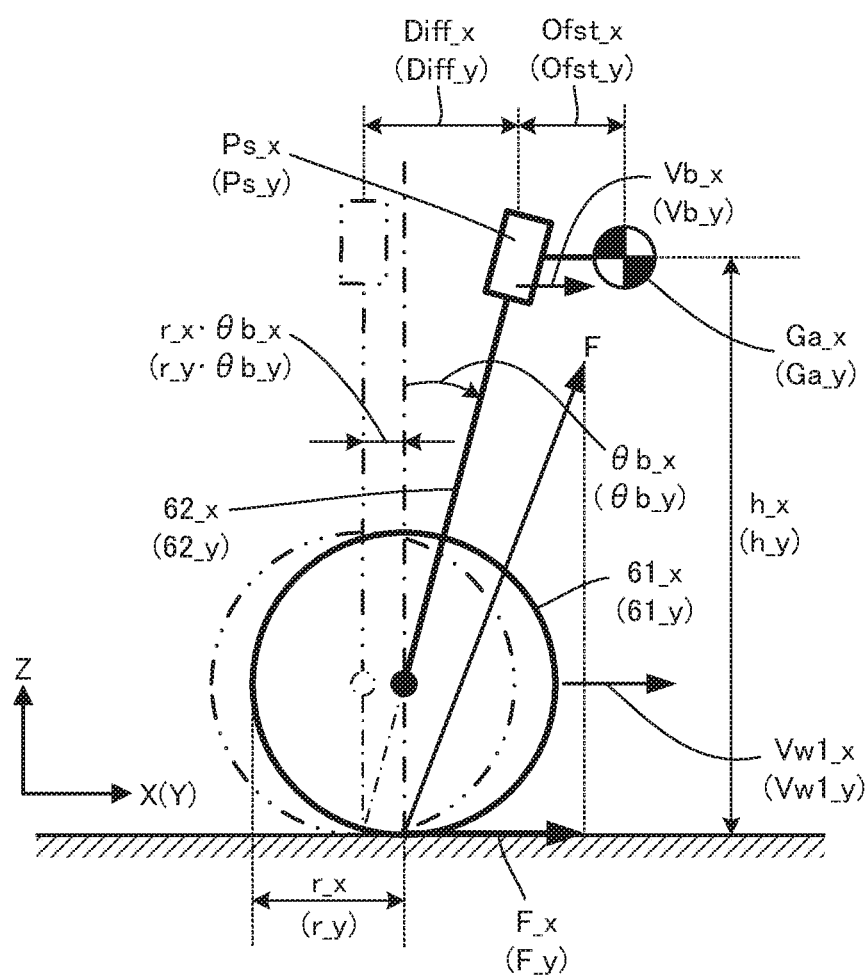
FIG. 5 is a diagram illustrating an inverted pendulum model used for the processing by the movement control unit shown in FIG. 3.

Before a specific description is made of the processing performed by the functional units of the movement control unit 21, the matters underlying the processing will be described. The dynamic behavior of the vehicle system overall center of gravity (more specifically, the behavior Observed from the Y-axis direction and the behavior observed from the X-axis direction) is approximately expressed by behavior of an inverted pendulum model as illustrated in FIG. 5. The algorithm of the processing by the movement control unit 21 has been established on the basis of this behavior.

In FIG. 5, for the purposes of illustrating both the inverted pendulum model observed from the Y-axis direction and the inverted pendulum model observed from the X-axis direction, the reference characters of the variables when the model is observed from the Y-axis direction are not parenthesized, and the reference characters of the variables when the model is observed from the X-axis direction are parenthesized.

The inverted pendulum model expressing the behavior of the vehicle system overall center of gravity observed from the Y-axis direction includes a virtual wheel 61_x which has a center of rotational axis parallel to the Y-axis direction and which is rollable on a floor surface (hereinafter, referred to as "virtual wheel 61_x"), a rod 62_x which is extended from the center of rotation of the virtual wheel 61_x and which is swingable about the axis of rotation of the virtual wheel 61_x (in the direction about the Y-axis), and a mass point Ga_x which is connected to a reference portion Ps_x, which is the distal end portion (upper end portion) of the rod 62_x.

In the inverted pendulum model, a motion of the mass point Ga_x corresponds to a motion of the vehicle system overall center of gravity observed from the Y-axis direction, and a tilt angle θb_x (the angle of tilt in the direction about the Y-axis) of the rod 62_x with respect to the vertical direction agrees with the tilt angle of the boarding section 5 (or the base body 2) in the direction about the Y-axis. Further, a translational motion of the traveling motion unit 3 in the X-axis direction corresponds to a translational motion in the X-axis direction by the rolling of the virtual wheel 61_x.

Further, a radius r_x of the virtual wheel 61_x and a height h_x of the reference portion Ps_x and the mass point Ga_x from a floor surface are predetermined values (fixed values) set in advance.

Similarly, the inverted pendulum model expressing the behavior of the vehicle system overall center of gravity observed from the X-axis direction includes a virtual wheel 61_y which has a center of rotational axis parallel to the X-axis direction and which is rollable on a floor surface (hereinafter, referred to as "virtual wheel 61_y"), a rod 62_y which is extended from the center of rotation of the virtual wheel 61_y and which is swingable about the axis of rotation of the virtual wheel 61_y (in the direction about the X-axis), and a mass point Ga_y which is connected to a reference portion Ps_y, which is the distal end portion (upper end portion) of the rod 62_y.

In the inverted pendulum model, a motion of the mass point Ga_y corresponds to a motion of the vehicle system overall center of gravity observed from the X-axis direction, and a tilt angle θb_y (the angle of tilt in the direction about the X-axis) of the rod 62_y with respect to the vertical direction agrees with the tilt angle of the boarding section 5 (or the base body 2) in the direction about the X-axis. Further, a translational motion of the traveling motion unit 3 in the Y-axis direction corresponds to a translational motion in the Y-axis direction by the rolling of the virtual wheel 61_y.

Further, a radius r_y of the virtual wheel 61_y and a height h_y of the reference portion Ps_y and the mass point Ga_y from a floor surface are predetermined values (fixed values) set in advance. It should be noted that the height h_y of the reference portion Ps_y and the mass point Ga_y from the floor surface observed in the X-axis direction are the same as the height h_x of the reference portion Ps_x and the mass point Ga_x from the floor surface observed in the Y-axis direction. Thus, h_x=h_y=h will apply hereinbelow.

Here, a description will be made supplementally of the positional relationship between the reference portion Ps_x and the mass point Ga_x when observed from the Y-axis direction. The position of the reference portion Ps_x corresponds to the position of the vehicle system overall center of gravity in the case where the operator boarding (seated on) the boarding section 5 is assumed to be immobile in a predetermined neutral posture with respect to the boarding section 5.

Therefore, in this case, the position of the mass point Ga_x agrees with the position of the reference portion Ps_x. The same applies to the positional relationship between the reference portion Ps_y and the mass point Ga_y when observed from the X-axis direction.

In reality, however, as the operator boarding the boarding section 5 moves his/her upper body or the like with respect to the boarding section 5 (or the base body 2), the actual position in the X-axis direction and the actual position in the Y-axis direction of the vehicle system overall center of gravity are usually displaced from the positions of the reference portions Ps_x and Ps_y, respectively, in a horizontal direction. Thus, in FIG. 5, the mass points Ga_x and Ga_y are shown in positions displaced from the positions of the reference portions Ps_x and Ps_y, respectively.

The behavior of the vehicle system overall center of gravity expressed by the inverted pendulum model as described above is represented by the following expressions (1a), (1b), (2a), and (2b). The expressions (1a) and (1b) represent the behavior observed in the Y-axis direction, and the expressions (2a) and (2b) represent the behavior observed in the X-axis direction.

$$Vb\_x = Vw1\_x + h \cdot \omega b\_x \tag{1a}$$

$$dVb\_x/dt = (g/h) \cdot (\theta b\_x \cdot (h - r\_x) + Ofst\_x) + \omega z \cdot Vb\_y \tag{1b}$$

$$Vb\_y = Vw1\_y + h\_y \cdot \omega b\_y \tag{2a}$$

$$dVb\_y/dt = (g/h) \cdot (\theta b\_y \cdot (h - r\_y) + Ofst\_y) + \omega z \cdot Vb\_x \tag{2b}$$

Here, Vb_x represents a velocity (a translational velocity) of the vehicle system overall center of gravity in the X-axis direction, θb_x represents a tilt angle of the boarding section 5 (or the base body 2) in the direction about the Y-axis, Vw1_x represents a moving velocity (a translational velocity) of the virtual wheel 61_x in the X-axis direction, ωb_x represents a temporal change rate of θb_x (=dθb_x/dt), Ofst_x represents an amount of displacement in the X-axis direction of the position of the vehicle system overall center of gravity in the X-axis direction (the position of the mass point Ga_x in the X-axis direction) from the position of the reference portion Ps_x, Vb_y represents a velocity (a translational velocity) of the vehicle system overall center of gravity in the Y-axis direction, Vw1_y represents a moving velocity (a translational velocity) of the virtual wheel 61_y in the Y-axis direction, θb_y represents a tilt angle of the boarding section 5 (or the base body 2) in the direction about the X-axis, ωb_y represents a temporal change rate of θb_y (=dθb_y/dt), and Ofst_y represents an amount of displacement in the Y-axis direction of the position of the vehicle system overall center of gravity in the Y-axis direction (the position of the mass point Ga_y in the Y-axis direction) from the position of the reference portion Ps_y. Further, ωz, represents a yaw rate (an angular velocity in the direction about a yap, when the vehicle 1 turns, and g represents a gravitational acceleration constant.

In the expressions (1a), (1b) (2a), and (2b), the positive directions of θb_x and ωb_x are the directions in which the vehicle system overall center of gravity tilts in the positive (forward) direction of the X-axis, and the positive directions of θb_y and ωb_y are the directions in which the vehicle system overall center of gravity tilts in the positive (leftward) direction of the Y-axis. Further, the positive direction of ωz is the counterclockwise direction when the vehicle 1 is observed from above.

In the present embodiment, the algorithm of the processing by the movement control unit 21 has been established, as described above, on the basis of the behavior model (the inverted pendulum model) of the vehicle system overall center of gravity, which takes accounts of the displacement amount of the vehicle system overall center of gravity from the reference portions Ps_x and Ps_y and a centrifugal force.

On the premise of the above, the processing by the movement control unit 21 will be described more specifically. Referring to FIG. 4, in each arithmetic processing cycle, the movement, control unit 21 firstly performs the processing by the operation command converter 31 and the processing by the center-of-gravity velocity estimator 33.

The operation command converter 31 determines a basic velocity command Vjs_x, which is the basic command value of the moving velocity (the translational velocity) of the traveling motion unit 3 in the X-axis direction, according to the amount of swing of the joystick 12 in the pitch direction (the forward swing amount or backward swing amount), and determines a basic velocity command Vjs_y, which is the basic command value of the moving velocity (the translational velocity) of the traveling motion unit 3 in the Y-axis direction, according to the amount of swing of the joystick 12 in the roll direction (the leftward swing amount or rightward swing amount).

In this case, the direction (polarity) of the basic velocity command Vjs_x in the X-axis direction is determined in accordance with the direction (forward direction or backward direction) of the swing of the joystick 12 in the pitch direction, and the magnitude of the basic velocity command Vjs_x is determined in accordance with the amount of swing of the joystick 12 in the pitch direction. Similarly, the direction (polarity) of the basic velocity command Vjs_y in the Y-axis direction is determined in accordance with the direction (leftward direction or rightward direction) of the swing of the joystick 12 in the roll direction, and the magnitude of the basic velocity command Vjs_y is determined in accordance with the amount of swing of the joystick 12 in the roll direction.

Supplementally, in the present embodiment, the joystick 12 is illustrated as the operating device for setting the basic velocity command Vjs_xy. Alternatively, the operating device for performing the setting operation of the basic velocity command Vjs_xy may be an operating device other than the joystick 12. For example, in the case where the control device 20 has been configured to be able to communicate with a mobile terminal such as a smartphone held by the operator, the mobile terminal can be used as the operating device for performing the setting operation of the basic velocity command Vjs_xy.

The center-of-gravity velocity estimator 33 calculates an estimated value Vb_estm1_xy of the velocity Vb of the vehicle system overall center of gravity on the basis of the kinematic relational expressions indicated by the foregoing expressions (1a) and (2a). Specifically, as shown in FIG. 4, the estimated value Vb_estm1_xy of the velocity Vb of the vehicle system overall center of gravity is calculated from a value of an actual translational velocity Vw1_act_xy of the traveling motion unit 3 and a value obtained by multiplying an actual temporal change rate (a tilt angular velocity) ωb_act_xy of the tilt angle θb_xy of the boarding section 5 by the height h of the vehicle system overall center of gravity, according to the following expressions (3a) and (3b).

$$Vb\_estm1\_x = Vw1\_act\_x + h \cdot \omega b\_act\_x \quad (3a)$$

$$Vb\_estm1\_y = Vw1\_act\_y + h \cdot \omega b\_act\_y \quad (3b)$$

In this case, as the values of Vw1_act_x and Vw1_act_y in the above calculation, the desired velocities Vw1_cmd_x and Vw1_cmd_y (last time's values) of the traveling motion unit 3 determined by the posture control arithmetic unit 34 in the last time's arithmetic processing cycle are used in the present embodiment. Alternatively, for example, latest values of Vw1_act_x and Vw1_act_y, obtained by detecting the rotational velocities of the electric motors 8a and 8b using the rotational velocity sensors 52a and 52b, respectively, and then performing estimation based on the detection values, may be used for the calculation of the expressions (3a) and (3b).

Further, in the present embodiment, as the values of ωb_act_x and ωb_act_y, latest values of the temporal change rates of the measurement values of the tilt angles θb_x and θb_y of the boarding section 5 based on the detection signals of the acceleration sensor 50 and the angular velocity sensor 51 (in other words, the latest values of the measurement values of ωb_act_x and ωb_act_y) are used.

The movement control unit 21 performs the processing by the operation command converter 31 and the center-of-gravity velocity estimator 33 as described above, and then performs the processing by the center-of-gravity displacement estimator 35 shown in FIG. 4, thereby determining an estimated center-of-gravity displacement amount Ofst_estm_xy, which is the estimated value of the center-of-gravity displacement amount Ofst_xy. It should be noted that in the following description concerning the center-of-gravity displacement estimator 35, the estimated values Vb_estm1_x and Vb_estm1_y of the velocity of the vehicle system overall center of gravity, calculated by the center-of-gravity velocity estimator 33, will be referred to as first estimated values Vb_estm1_x and Vb_estm1_y, respectively.

Figure 6:
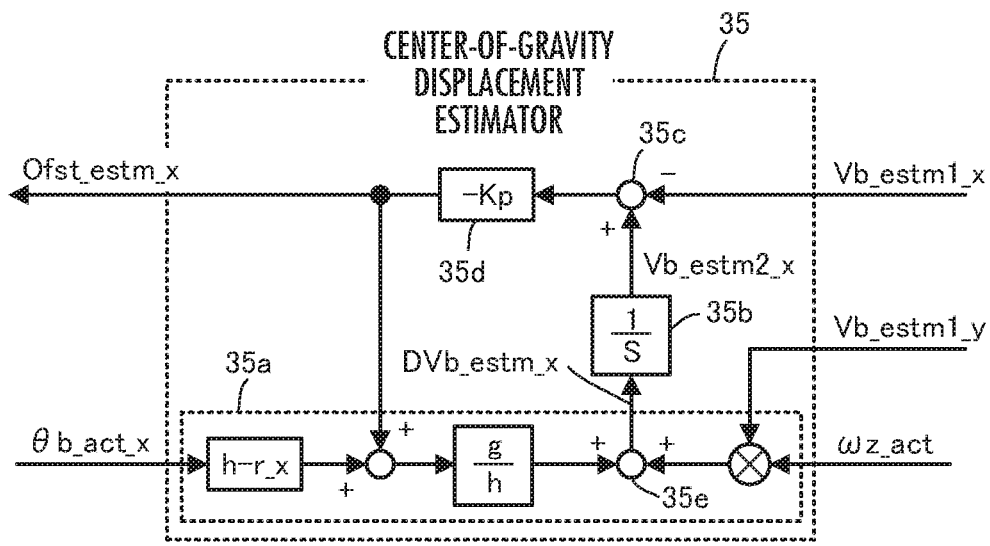
FIG. 6 is a block-and-line diagram showing processing by a center-of-gravity displacement estimator shown in FIG. 4.

In the present embodiment, the processing of the center-of-gravity displacement estimator 35 is performed as shown by the block-and-line diagram in FIG. 6, for example. FIG. 6 representatively shows the processing of determining an estimated center-of-gravity displacement amount Ofst_estm_x in the X-axis direction of the estimated center-of-gravity displacement amount Ofst_estm_xy.

The processing shown in FIG. 6 will now be described specifically. The center-of-gravity displacement estimator 35 performs the arithmetic processing of the right side of the above expression (1b) in an arithmetic section 35a, by using a measurement value (a latest value) of the actual tilt angle θb_act_x in the direction about the Y-axis of the boarding section 5 and a measurement value (a latest value) of the actual yaw rate ωz_act of the vehicle 1, which are obtained from the detection signals of the acceleration sensor 50 and the angular velocity sensor 51, a first estimated value Vb_estm1_y (a latest value) of the velocity in the Y-axis direction of the vehicle system overall center of gravity calculated by the center-of-gravity velocity estimator 33, and an estimated center-of-gravity displacement amount Ofst_estm_x (a last time's value) in the X-axis direction determined in the last time's arithmetic processing cycle. This yields an estimated value DVb_estm_x of the translational acceleration in the X-axis direction of the vehicle system overall center of gravity.

The center-of-gravity displacement estimator 35 further performs, in an arithmetic section 35b, processing of integrating the estimated value DVb_estm_x of the translational acceleration in the X-axis direction of the vehicle system overall center of gravity, to thereby calculate a second estimated value Vb_estm2_x of the velocity in the X-axis direction of the vehicle system overall center of gravity.

Subsequently, the center-of-gravity displacement estimator 35 performs, in an arithmetic section 35c, processing of calculating a difference between a second estimated value Vb_estm2_x (a latest value) and a first estimated value Vb_estm1_x (a latest value) of the velocity in the X-axis direction of the vehicle system overall center of gravity.

Further, the center-of-gravity displacement estimator 35 performs, in an arithmetic section 35d, processing of multiplying the difference by a gain (−Kp) of a predetermined value, to thereby determine a latest value of the estimated center-of-gravity displacement amount Ofst_estm_x in the X-axis direction.

The processing of determining the estimated center-of-gravity displacement amount Ofst_estm_y in the Y-axis direction is performed in a similar manner as described above. Specifically, a block-and-line diagram showing this determination processing is obtained by replacing the suffixes "_x" and "_y" in FIG. 6 with each other and by replacing the sign "+" of the acceleration component (the acceleration component generated by a centrifugal force), which is one of the inputs to an adder 35e that is on the right side in the drawing, with "−".

Subsequently, the movement control unit 21 performs the processing by the center-of-gravity displacement influence amount calculator 36 shown in FIG. 4, to thereby calculate a center-of-gravity displacement influence amount Vofs_xy. The center-of-gravity displacement influence amount Vofs_xy indicates the deviation of an actual velocity from a desired velocity of the vehicle system overall center of gravity in the case where feedback control is conducted in the posture control arithmetic unit 34, which will be described later, without considering the displacement of the position of the vehicle system overall center of gravity from the position of the reference portion Ps_xy in the inverted pendulum model.

The center-of-gravity displacement influence amount calculator 36 calculates the center-of-gravity displacement influence amount Vofs_xy by multiplying each component of a newly determined estimated center-of-gravity displacement amount Ofst_estm_xy by a value of (Kth_xy/(h−r_xy))/Kvb_xy.

Here, Kth_xy is a gain value for determining a manipulated variable component that functions to bring the tilt angle of the boarding section 5 close to zero in the processing performed by the posture control arithmetic unit 34, which will be described later. Kvb_xy is a gain value for determining a manipulated variable component that functions to bring the difference between a desired velocity Vb_cmd_xy of the vehicle system overall center of gravity and a first estimated value Vb_estm1_xy of the velocity of the vehicle system overall center of gravity close to zero in the processing by the posture control arithmetic unit 34, which will be described later.

Next, the movement control unit 21 performs the processing by the desired center-of-gravity velocity determiner 32 shown in FIG. 4, to thereby calculate a desired velocity Vb_cmd_xy of the vehicle system overall center of gravity (hereinafter, referred to as "desired center-of-gravity velocity Vb_cmd_xy") for each arithmetic processing cycle.

In this case, the desired center-of-gravity velocity determiner 32 firstly determines a basic value V1_xy of the desired center-of-gravity velocity Vb_cmd_xy from a basic velocity command Vjs_xy (a latest value) determined by the operation command converter 31 and a center-of-gravity displacement influence amount Vofs_xy (a latest value) determined by the center-of-gravity displacement influence amount calculator 36. The basic value V1_xy corresponds to a required value of the velocity of the vehicle system overall center of gravity, which is responsive to the operation of the joystick 12 and an estimated center-of-gravity displacement amount Ofst_estm_xy associated with the movement of the operator's upper body. Hereinafter, the basic value V1_xy will be referred to as "basic required center-of-gravity velocity V1_xy".

Specifically, the desired center-of-gravity velocity determiner 32 performs, in a processing section 32a, dead zone processing and limiting processing on the center-of-gravity displacement influence amount Vofs_xy, to thereby determine a center-of-gravity velocity additive amount Vb_cmd_by_ofs_xy as a component according to the estimated center-of-gravity displacement amount Ofst_estm_xy of the basic required center-of-gravity velocity V1_xy.

In more detail, in the present embodiment, the desired center-of-gravity velocity determiner 32 sets the center-of-gravity velocity additive amount Vb_cmd_by_oft_x in the X-direction to zero in the case where the magnitude of the center-of-gravity displacement influence amount Vofs_x in the X-axis direction takes a value (relatively close to zero) within a dead zone, which is a predetermined range in the vicinity of zero.

Further, in the case where the magnitude of the center-of-gravity displacement influence amount Vofs_x in the X-axis direction takes a value that falls outside the dead zone, the desired center-of-gravity velocity determiner 32 determines the center-of-gravity velocity additive amount Vb_cmd_by_ofs_x in the X-axis direction to be a value having the same polarity as Vofs_x and having a magnitude that increases with increasing magnitude of Vofs_x. However, the value of the center-of-gravity velocity additive amount Vb_cmd_by_ofs_x is limited to within a range between a predetermined upper limit (>0) and a predetermined lower limit (≤0). The processing of determining a center-of-gravity velocity additive amount Vb_cmd_by_ofs_y in the Y-axis direction is the same as described above.

Subsequently, the desired center-of-gravity velocity determiner 32 performs, in a processing section 32b, processing of adding each component of the center-of-gravity velocity additive amount Vb_cmd_by_ofs_xy to the corresponding component of the basic velocity command Vjs_xy determined by the operation command converter 31, to thereby calculate a basic required center-of-gravity velocity V1_xy. In other words, the basic required center-of-gravity velocity V1_xy (a set of V1_x and V1_y) is determined by the processing of: V1_x=Vjs_x+Vb_cmd_by_ofs_x and V1_y=Vjs_y+Vb_cmd_by_ofs_y.

Supplementally, in the vehicle 1 according to the present embodiment, the operation of the joystick 12 and the change of the center-of-gravity displacement amount Ofst_xy associated with the movement of the operator's upper body (the weight shift) corresponds to the maneuvering operation of the vehicle 1. Further, the basic required center-of-gravity velocity V1_xy corresponds to the basic movement command in the present invention. The processing performed by the processing sections 32a and 32b of the desired center-of-gravity velocity determiner 32 corresponds to the processing by the basic movement command generation unit in the present invention.

The desired center-of-gravity velocity determiner 32 further sets, in a velocity restriction factor setting section 32c, a velocity restriction factor α_xy (a set of α_x and α_y) for placing restrictions on the basic required center-of-gravity velocity V1_xy according to a positional relationship between the vehicle 1 and an obstacle specified by obstacle information obtained from an external server or the like and a measurement value of the self-position. The desired center-of-gravity velocity determiner 32 also sets, in a yaw rate command setting section 32d, a yaw rate command ωz_cmd which is a command value of the yaw rate to be additionally generated on the vehicle 1.

The X-axis direction component and the Y-axis direction component of the velocity restriction factor α_xy are factors, each taking a value within a range from "0" to "1", that are multiplied by the X-axis direction component and the Y-axis direction component, respectively, of the basic required center-of-gravity velocity V1_xy so as to place restrictions on the X-axis direction component and the Y-axis direction component of the basic required center-of-gravity velocity V1_xy.

The velocity restriction factor setting section 32c receives, as the information indicating the positional relationship between the vehicle 1 and the obstacle, a distance d between the vehicle 1 and the obstacle and an azimuth ϕ indicating the direction of the vehicle 1 with respect to the obstacle. The distance d and the azimuth ϕ are specified based on the obstacle information obtained from an external server or the like and a measurement value of the self-position.

Figure 7:
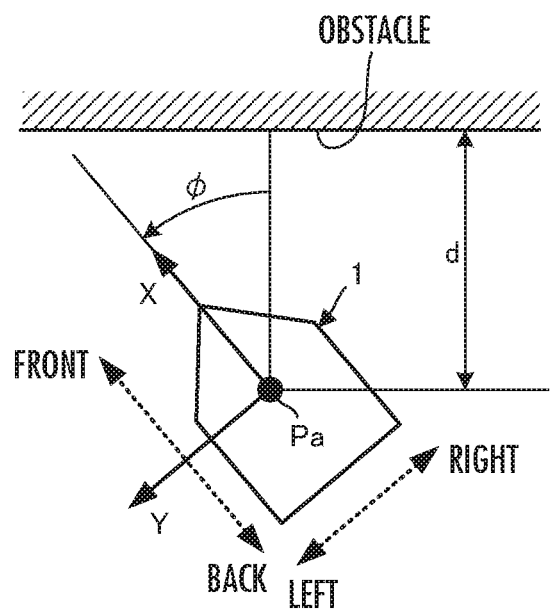
FIG. 7 is an explanatory diagram about processing by a velocity restriction factor setting section and a yaw rate command setting section shown in FIG. 4.

Here, referring to FIG. 7, in the present embodiment, the distance d refers to a shortest distance between the obstacle and a representative point Pa of the vehicle 1 (e.g., a ground contact point of the traveling motion unit 3 or the like), and the azimuth ϕ refers to a tilt angle in the longitudinal direction (X-axis direction) of the vehicle 1 (a tilt angle in the yaw direction) with respect to the direction of the distance d. In FIG. 7 the vehicle 1 is shown schematically.

In this case, the azimuth ϕ is zero in the case where the longitudinal direction (the X-axis direction) of the vehicle 1 agrees with the direction of the distance d and there is an obstacle in front (in the positive direction of the X-axis) of the vehicle 1. Further, the polarity of the azimuth ϕ is positive when the frontward direction of the vehicle 1 is tilted in a counterclockwise direction from the direction of the distance d, and is negative when tilted in a clockwise direction from the direction of the distance d. The azimuth ϕ therefore is an angle within a range between −180° and +180°. In the example shown in FIG. 7, ϕ>0.

Figure 8:
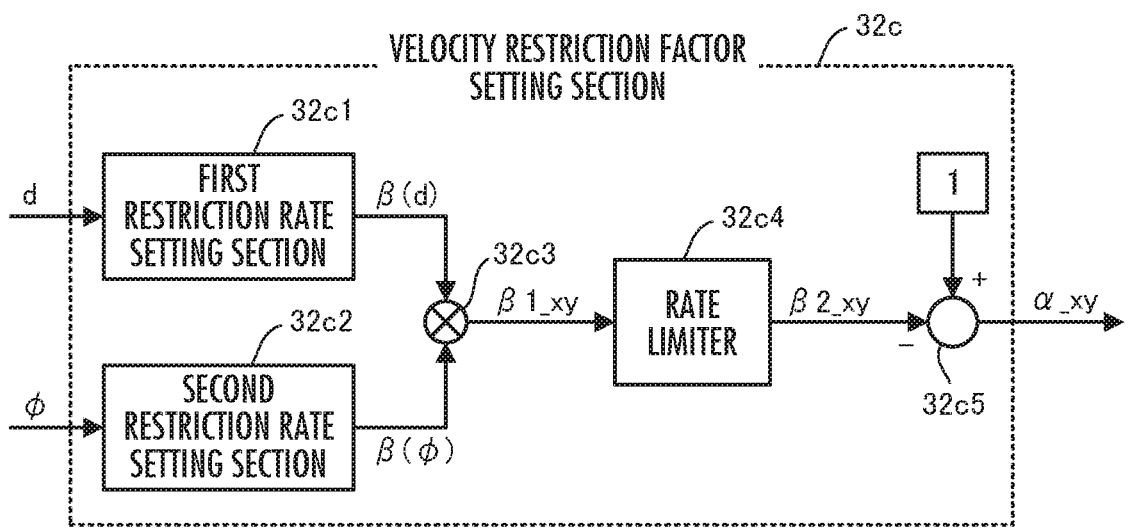
FIG. 8 is a block-and-line diagram showing processing by the velocity restriction factor setting section shown in FIG. 4.

The velocity restriction factor setting section 32c performs the processing shown by the block-and-line diagram in FIG. 8 to determine the velocity restriction factor α on the basis of the input distance d and azimuth ϕ. Specifically, the velocity restriction factor setting section 32c performs, in a first restriction rate setting section 32c1, processing of setting a first restriction rate β(d) according to the input distance d, and also performs, in a second restriction rate setting section 32c2, processing of setting a second restriction rate β(ϕ) according to the input azimuth ϕ.

The first restriction rate β(d) and the second restriction rate β(ϕ) are parameters indicating requirements concerning the degree of restriction of the desired center-of-gravity velocity Vb_cmd_x relative to the basic required center-of-gravity velocity V1_xy. In the present embodiment, the restriction rates are each set to a value within a range from "0" to "1". The values of β(d) and β(ϕ) each indicate that as the value is larger (closer to "1"), the requirement to make the desired center-of-gravity velocity Vb_cmd_xy closer to "0" than the basic required center-of-gravity velocity V1_xy is higher (i.e., the requirement to increase the degree of restriction of Vb_cmd_xy with respect to V1_xy is higher).

Figure 9:
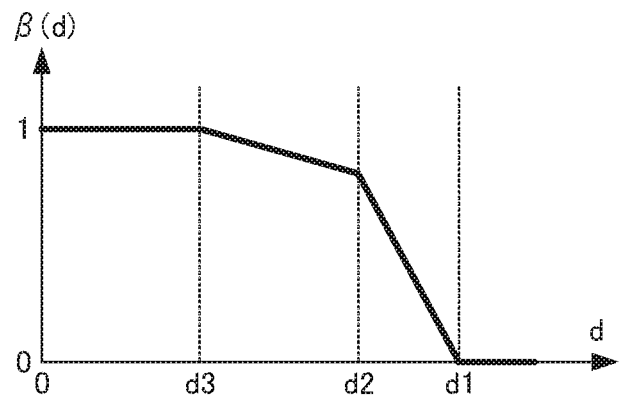
FIG. 9 is a graph illustrating processing by a first restriction rate setting section shown in FIG. 8.

The first restriction rate setting section 32c1 sets the first restriction rate β(d) on the basis of the distance d input to the velocity restriction factor setting section 32c, in accordance with a preset mapping or arithmetic expression, in a form indicated by the graph in FIG. 9, for example. That is, in the case where the distance d is greater than a predetermined value d1 (when the vehicle 1 is far enough away from the obstacle), the first restriction rate β(d) is set to zero. In the case where the distance d is in a range between the predetermined value d1 and a predetermined value d2 (<d1), and in the case where the distance d is in a range between the predetermined value d2 and a predetermined value d3 (<d2), the first restriction rate β(d) is set such that the rate increases from "0" to "1" with decreasing distance d. In the case where the distance d is not greater than the predetermined value d3, the first restriction rate β(d) is maintained at "1".

In this case, the first restriction rate β(d) is set such that the rate of increase of the first restriction rate β(d) with respect to the decrease of the distance d (the amount of increase in β(d) per unit decrease in the distance d) becomes greater in the range from d1 to d2 than in the range from d2 to d3. Consequently, in the range from d1 to d3, the first restriction rate β(d) is set such that the rate of increase of the first restriction rate β(d) with respect to the decrease of the distance d decreases as the distance d decreases.

Supplementally, the first restriction rate β(d) set in the above-described manner corresponds to the first restriction degree index value in the present invention. Further, the predetermined value d1 of the distance d corresponds to the first predetermined value in the present invention.

The second restriction rate β(ϕ) set by the second restriction rate setting section 32c2 is composed of: a second restriction rate β(ϕ)_fd_x for restricting a forward (positive) basic required center-of-gravity velocity V1_x in the X-axis direction, a second restriction rate β(ϕ)_bk_x for restricting a backward (negative) basic required center-of-gravity velocity V1_x in the X-axis direction, a second restriction rate β(ϕ)_L_y for restricting a leftward (positive) basic required center-of-gravity velocity V1_y in the Y-axis direction, and a second restriction rate β(ϕ)_R_y for restricting a rightward (negative) basic required center-of-gravity velocity V1_y in the Y-axis direction.

The second restriction rate setting section 32c2 sets these second restriction rates β(ϕ)_fd_x, β(ϕ)_bk_x, β(ϕ)_L_y, and β(ϕ)_R_y on the basis of the azimuth ϕ and distance d input to the velocity restriction factor setting section 32c, in accordance with a preset mapping or arithmetic expression.

Specifically, in the case where the distance d is greater than the above-described predetermined value d3 (in other words, when the first restriction rate β(d) is set to a value smaller than "1"), the second restriction rate setting section 32c2 sets β(ϕ)_fd_x, β(ϕ)_bk_x, β(ϕ)_L_y, and β(ϕ)_R_y basically in functional forms indicated, for example, by the graphs in FIGS. 10A, 11A, 12A, and 13A, respectively, according to the azimuth ϕ. However, the second restriction rates β(ϕ)_fd_x, β(ϕ)_bk_x, β(ϕ)_L_y, and β(ϕ)_R_y each have a lower limit β(ϕ)_low which is a predetermined value slightly greater than "0".

Figure 10A:
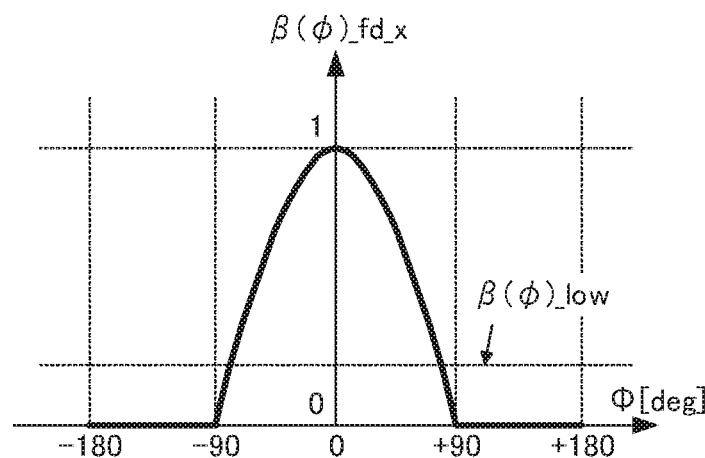
FIGS. 10A and 10B are graphs illustrating processing by a second restriction rate setting section shown in FIG. 8.

In this case, the second restriction rate β(ϕ)_fd_x for the forward basic required center-of-gravity velocity V1_x (>0) is set basically in the functional form, as indicated by the graph in FIG. 10A, such that with the azimuth ϕ in a range from −90° to +90°, the rate increases from "0" to "1" as ϕ approaches 0°, and with the azimuth ϕ in a range from −90° to −180° and in a range from +90° to +180°, the rate is set to "0". However, in the case where the value set in accordance with the functional form is smaller than the predetermined lower limit $\beta(\phi)\_low$, the second restriction rate $\beta(\phi)\_fd\_x$ is limited to the lower limit $\beta(\phi)\_low$.

Figure 11A:
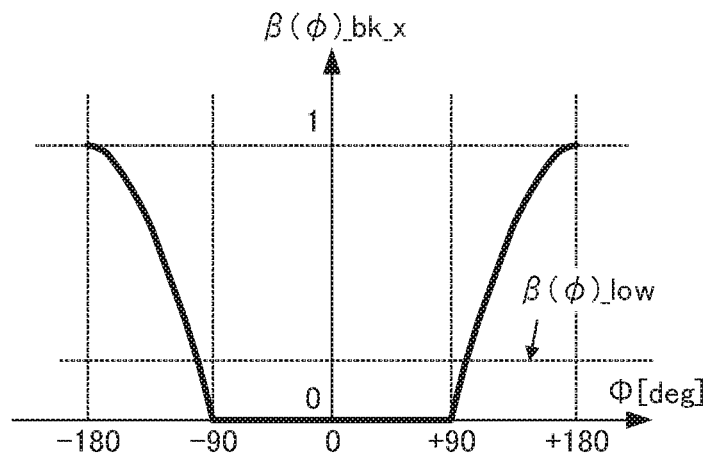
FIGS. 11A and 11B are graphs illustrating the processing by the second restriction rate setting section shown in FIG. 8.

Further, the second restriction rate $\beta(\phi)\_bk\_x$ for the backward basic required center-of-gravity velocity $V1\_x$ (<0) is set basically in the functional form, as indicated by the graph in FIG. 11A, such that with the azimuth $\phi$ in a range from $-90°$ to $+90°$, the rate is set to "0", and with the azimuth $\phi$ in a range from $-90°$ to $-180°$ and in a range from $+90°$ to $+180°$, the rate increases from "0" to "1" with the increase in magnitude (absolute value) of the azimuth $\phi$. However, in the case where the value set in accordance with the functional form is smaller than the predetermined lower limit $\beta(\phi)\_low$, second restriction rate $\beta(\phi)\_bk\_x$ is limited to the lower limit $\beta(\phi)\_low$.

Figure 12A:
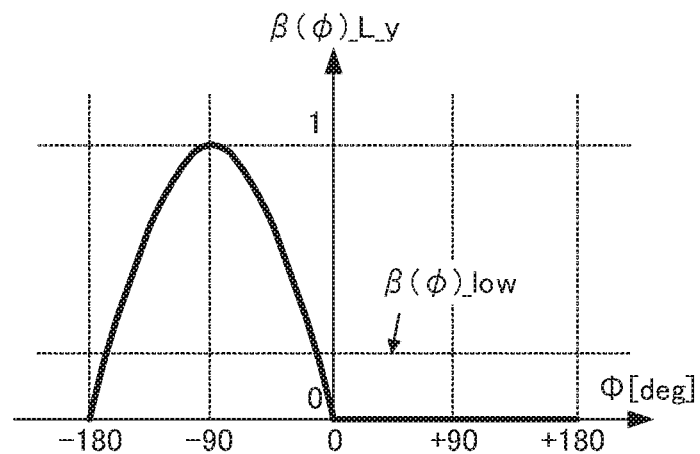
FIGS. 12A and 12B are graphs illustrating the processing by the second restriction rate setting section shown in FIG. 8.

The second restriction rate $\beta(\phi)\_L\_y$ for the leftward basic required center-of-gravity velocity $V1\_y$ (>0) is set basically in the functional form, as indicated by the graph in FIG. 12A, such that with the azimuth $\phi$ in a range from $0°$ to $-180°$, the rate increases from "0" to "1" as $\phi$ approaches $-90°$, and with the azimuth $\phi$ not smaller than $0°$, the rate is set to "0". However, in the case where the value set in accordance with the functional form is smaller than the predetermined lower limit $\beta(\phi)\_low$, the second restriction rate $\beta(\phi)\_L\_y$ is limited to the lower limit $\beta(\phi)\_low$.

Figure 13A:
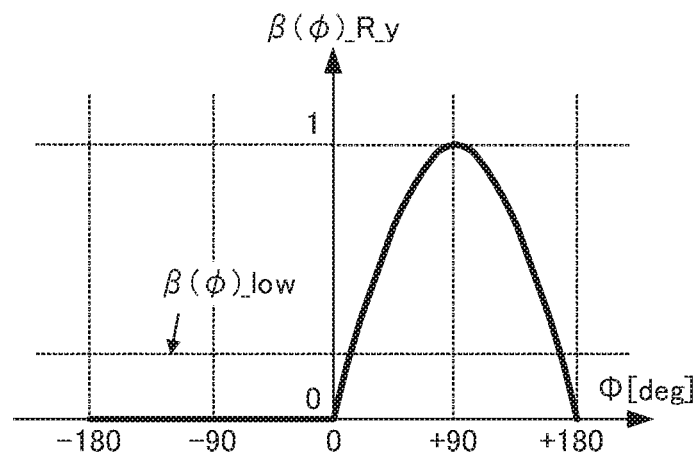
FIGS. 13A and 13B are graphs illustrating the processing by the second restriction rate setting section shown in FIG. 8.

Further, the second restriction rate $\beta(\phi)\_R\_y$ for the rightward basic required center-of-gravity velocity $V1\_y$ (<0) is set basically in the functional form, as indicated by the graph in FIG. 13A, such that with the azimuth $\phi$ in a range from $0°$ to $+180°$, the rate increases from "0" to "1" as $\phi$ approaches $+90°$, and with the azimuth $\phi$ not greater than $0°$, the rate is set to "0". However, in the case where the value set in accordance with the functional form is smaller than the predetermined lower limit $\beta(\phi)\_low$, the second restriction rate $\beta(\phi)\_R\_y$ is limited to the lower limit $\beta(\phi)\_low$.

In the case where the distance d is not greater than the predetermined value d3 (in other words, when the first restriction rate $\beta(d)$ is set to "1"), the second restriction rate setting section 32c2 sets the second restriction rates $\beta(\phi)\_fd\_x$, $\beta(\phi)\_bk\_x$, $\beta(\phi)\_L\_y$, and $\beta(\phi)\_R\_y$ basically in the functional forms indicated, for example, by the graphs in FIGS. 10B, 11B, 12B, and 13B, respectively, according to the azimuth $\phi$.

Figure 10B:
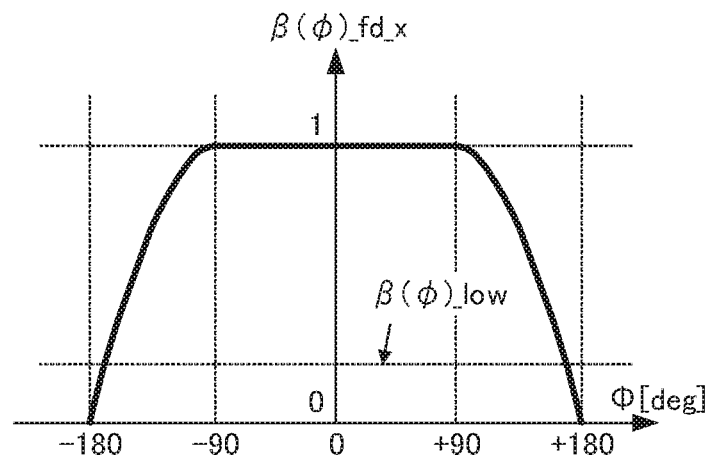

In this case, the second restriction rate $\beta(\phi)\_fd\_x$ for the forward basic required center-of-gravity velocity $V1\_x$ (>0) is set basically in the functional form, as indicated by the graph in FIG. 10B, such that with the azimuth $\phi$ in a range from $-90°$ to $+90°$, the rate is set to "1", and with the azimuth $\phi$ in a range from $-90°$ to $-180°$ and in a range from $+90°$ to $+180°$, the rate increases from "0" to "1" with the decrease in magnitude (absolute value) of $\phi$. However, in the case where the value set in accordance with the functional form is smaller than the predetermined lower limit $\beta(\phi)\_low$, the second restriction rate $\beta(\phi)\_fd\_x$ is limited to the lower limit $\beta(\phi)\_low$.

Figure 11B:
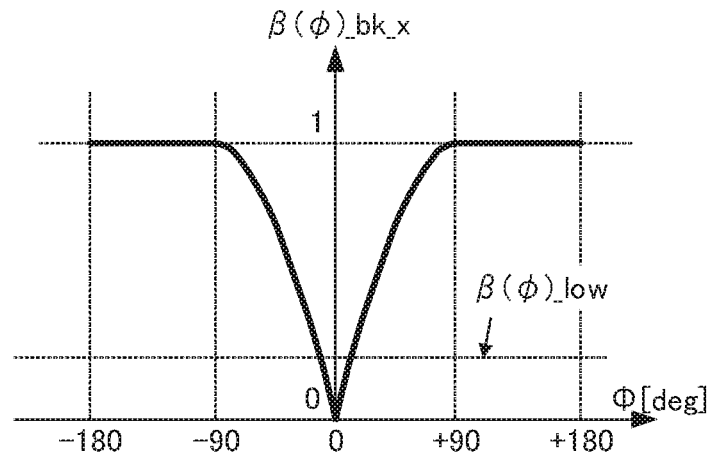

Further, the second restriction rate $\beta(\phi)\_bk\_x$ for the backward basic required center-of-gravity velocity $V1\_x$ (<0) is set basically in the functional form, as indicated by the graph in FIG. 11B, such that the rate increases from "0" to "1" with the increase in magnitude (absolute value) of the azimuth $\phi$ from "0". However, in the case where the value set in accordance with the functional form is smaller than the predetermined lower limit $\beta(\phi)\_low$, the second restriction rate $\beta(\phi)\_bk\_x$ is limited to the lower limit $\beta(\phi)\_low$.

Figure 12B:
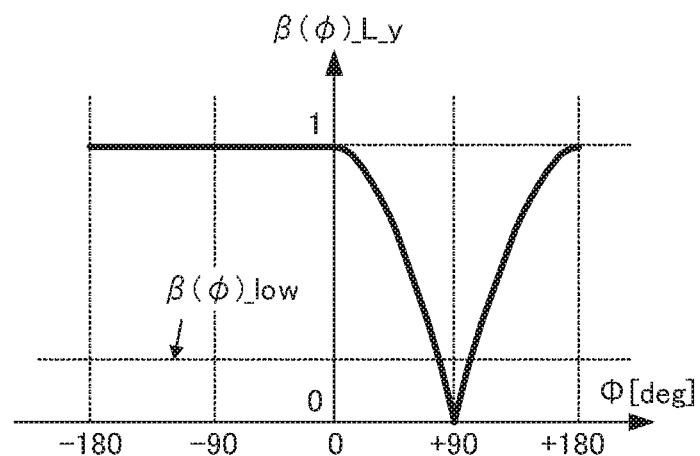

The second restriction rate $\beta(\phi)\_L\_y$ for the leftward basic required center-of-gravity velocity $V1\_y$ (>0) is set basically in the functional form, as indicated by the graph in FIG. 12B, such that with the azimuth $\phi$ in a range from $0°$ to $-180°$, the rate is set to "1", and with the azimuth $\phi$ in a range from $0°$ to $+180°$, the rate increases from "0" to "1" with the increase in magnitude (absolute value) of the difference between $\phi$ and $+90°$. However, in the case where the value set in accordance with the functional form is smaller than the predetermined lower limit $\beta(\phi)\_low$, the second restriction rate $\beta(\phi)\_L\_y$ is limited to the lower limit $\beta(\phi)\_low$.

Figure 13B:
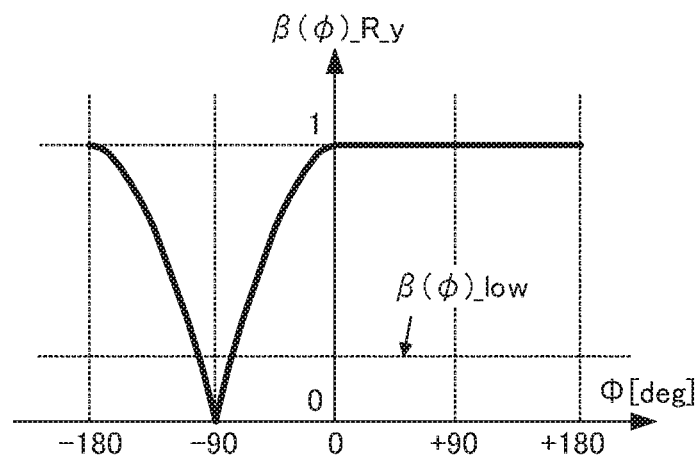
Figure 15A:
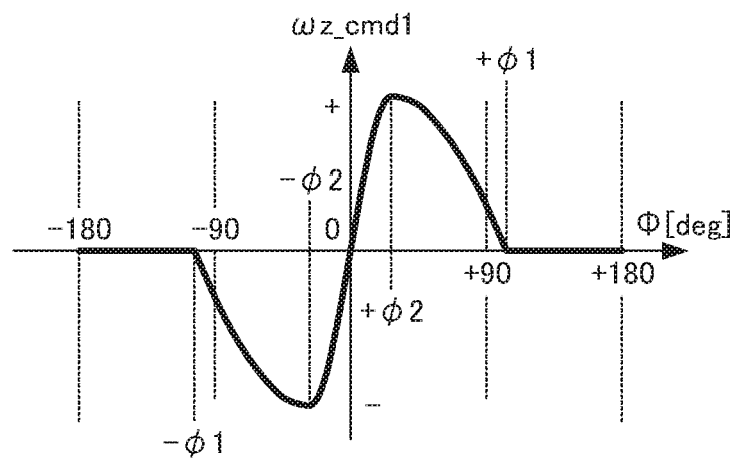
FIG. 15A is a graph illustrating processing by a basic yaw rate setting section shown in FIG. 14.
Figure 15B:
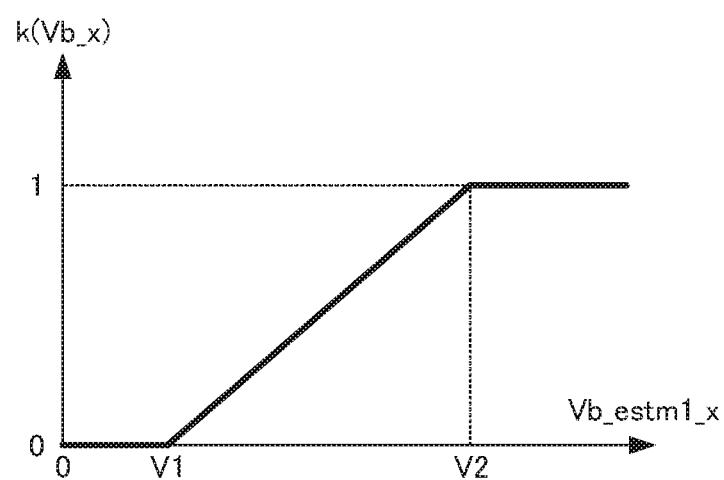
FIG. 15B is a graph illustrating processing by a velocity factor setting section shown in FIG. 14.

Further, the second restriction rate $\beta(\phi)\_R\_y$ for the rightward basic required center-of-gravity velocity $V1\_y$ (<0) is set basically in the functional form, as indicated by the graph in FIG. 13B, such that with the azimuth $\phi$ in a range from $0°$ to $+180°$, the rate is set to "1", and with the azimuth $\phi$ in a range from $0°$ to $-180°$, the rate increases from "0" to "1" with the increase in magnitude (absolute value) of the difference between $\phi$ and $90°$. However, in the case where the value set in accordance with the functional form is smaller than the predetermined lower limit $\beta(\phi)\_low$, the second restriction rate $\beta(\phi)\_R\_y$ is limited to the lower limit $\beta(\phi)\_low$.

In the case where the distance d is not greater than the predetermined value d3, the second restriction rates $\beta(\phi)\_fd\_x$, $\beta(\phi)\_bk\_x$, $\beta(\phi)\_L\_y$, and $\beta(\phi)\_R\_y$ are set according to the azimuth $\phi$ as described above. Therefore, in the case where $d \leq d3$, the second restriction rates $\beta(\phi)\_fd\_x$, $\beta(\phi)\_bk\_x$, $\beta(\phi)\_L\_y$, and $\beta(\phi)\_R\_y$ each take a value "1" or close thereto over a wider range of $\phi$ than in the case where $d > d3$ (in other words, the range of $\phi$ in which the rate takes a value equal to or close to the lower limit $\beta(\phi)\_low$ is reduced).

Supplementally, the second restriction rate $\beta(\phi)$ set in the above-described manner corresponds to the second restriction degree index value in the present invention. Further, the predetermined value d3 for the distance d corresponds to the second predetermined value in the present invention.

After determining the first restriction rate $\beta(d)$ and the second restriction rate $\beta(\phi)$ $\beta(\phi)\_fd\_x$, $\beta(\phi)\_bk\_x$, $\beta(\phi)\_L\_y$, and $\beta(\phi)\_R\_y$ in the above-described manner, the velocity restriction factor setting section 32c performs, in a processing section 32c3, processing of multiplying the first restriction rate $\beta(d)$ by the second restriction rate $\beta(\phi)$, to thereby calculate a resultant restriction rate $\beta1\_xy$ (a set of $\beta1\_x$ and $\beta1\_y$) concerning the velocities in the X-axis direction and the Y-axis direction.

Specifically, in the processing section 32c3, in the case where the basic required center-of-gravity velocity $V1\_x$ in the X-axis direction is a forward velocity, a resultant restriction rate $\beta1\_x$ related to the velocity in the X-axis direction is calculated by the arithmetic operation of $\beta1\_x = \beta(d) \cdot \beta(\phi)\_fd\_x$. In the case where the basic required center-of-gravity velocity $V1\_x$ in the X-axis direction is a backward velocity, the resultant restriction rate related to the velocity in the X-axis direction is calculated by the arithmetic operation of $\beta1\_x = \beta(d) \cdot \beta(\phi)\_bk\_x$.

In the case where the basic required center-of-gravity velocity $V1\_y$ in the Y-axis direction is a leftward velocity, a resultant restriction rate $\beta1\_y$ related to the velocity in the Y-axis direction is calculated by the arithmetic operation of $\beta1\_y = \beta(d) \cdot \beta(\phi)\_L\_y$. In the case where the basic required center-of-gravity velocity $V1\_y$ in the Y-axis direction is a rightward velocity, the resultant restriction rate $\beta1\_y$ related to the velocity in the Y-axis direction is calculated by the arithmetic operation of $\beta1\_y = \beta(d) \cdot \beta(\phi)\_R\_y$. The resultant restriction rate $\beta1\_xy$ calculated by the processing section 32c3 is a provisional value, so hereinbelow, it will be referred to as "provisional resultant restriction rate $\beta1\_xy$".

Subsequently, the velocity restriction factor setting section 32c performs, in a rate limiter 32c4, limiting processing on the provisional resultant restriction rate $\beta 1\_xy$, to thereby determine a finalized resultant restriction rate $\beta 2\_xy$, which is the resultant restriction rate actually used for determining the above-described velocity restriction factor $\alpha\_xy$. This limiting processing performed by the rate limiter 32c4 is the processing for restricting the temporal change rate (the amount of change per unit time) of the finalized resultant restriction rate $\beta 2\_xy$.

In the limiting processing, it is determined whether the absolute value of a difference $\Delta\beta\_xy$ for each component ($\Delta\beta\_x = \beta 1\_x - \beta 2\_x\_p$, $\Delta\beta\_y = \beta 1\_y - \beta 2\_y\_p$) between a provisional resultant restriction rate $\beta 1\_xy$ calculated in the current time's (present) arithmetic processing cycle of the movement control unit 21 and a finalized resultant restriction rate $\beta 2\_xy\_p$ determined in the last time's arithmetic processing cycle falls within a range not greater than a predetermined upper limit $\Delta\beta$max_xy.

Then, $\beta 2\_x$ of the finalized resultant restriction rate $\beta 2\_xy$ in the current time's (present) arithmetic processing cycle is determined according to whether or not the absolute value of $\Delta\beta\_x$ of $\Delta\beta\_xy$ falls within the range not greater than the upper limit $\Delta\beta$max_x, in the following manner. In the case where the absolute value of $\Delta\beta\_x$ falls within the range not greater than the upper limit $\Delta\beta$max_x, the provisional resultant restriction rate $\beta 1\_x$ calculated in the processing section 32c3 is determined as it is as the finalized resultant restriction rate $\beta 2\_x$ in the current time's arithmetic processing cycle.

In the case where the absolute value of $\Delta\beta\_x$ is greater than the upper limit $\Delta\beta$max_x, the finalized resultant restriction rate $\beta 2\_x$ in the current time's arithmetic processing cycle is limited to a value obtained by adding $\Delta\beta$max_x or $-\Delta\beta$max_x to the finalized resultant restriction rate $\beta 2\_x\_p$ in the last time's arithmetic processing cycle. In more detail, when $\Delta\beta\_x < -\Delta\beta$max_x, the finalized resultant restriction rate $\beta 2\_x$ in the current timer'arithmetic processing cycle is determined by the arithmetic operation of $\beta 2\_x = \beta 2\_x\_p - \Delta\beta$max_x. When $\Delta\beta\_x > \Delta\beta$max_x, the finalized resultant restriction rate $\beta 2\_x$ in the current time's arithmetic processing cycle is determined by the arithmetic operation of $\beta 2\_x = \beta 2\_x\_p + \Delta\beta$max_x.

Further, $\beta 2\_y$ of the finalized resultant restriction rate $\beta 2\_xy$ in the current time's (present) arithmetic processing cycle is determined according to whether or not the absolute value of $\Delta\beta\_y$ of $\Delta\beta\_xy$ falls within the range not greater than the upper limit $\Delta\beta$max_y, in a similar manner as described above. Determining the finalized resultant restriction rate $\beta 2\_xy$ in the above-described manner causes the finalized resultant restriction rate $\beta 2\_xy$ to be determined to converge to the provisional resultant restriction rate $\beta 1\_xy$, with the sudden change thereof being suppressed.

Subsequently, the velocity restriction factor setting section 32c performs, in a processing section 32c5, processing of subtracting each component of the finalized resultant restriction rate $\beta 2\_xy$ determined as described above from "1", to thereby determine the velocity restriction factor $\alpha\_xy$. That is, each component of the velocity restriction factor $\alpha\_xy$ is determined by the arithmetic operations of $\alpha\_x = 1 - \beta 2\_x$ and $\alpha\_y = 1 - \beta 2\_y$.

Accordingly, $\alpha\_x$ of the velocity restriction factor $\alpha\_xy$ is determined so as to become smaller (to approach "0") as the finalized resultant restriction rate $\beta 2\_x$ is greater (in other words, as the requirement to increase the degree of restriction of the desired center-of-gravity velocity Vb_cmd_x with respect to the basic required center-of-gravity velocity V1_x in the X-axis direction is higher).

Similarly, $\alpha\_y$ of the velocity restriction factor $\alpha\_xy$ is determined so as to become smaller (to approach "0") as the finalized resultant restriction rate $\beta 2\_y$ is greater (in other words, with the higher requirement to increase the degree of restriction of the desired center-of-gravity velocity Vb_cmd_y with respect to the basic required center-of-gravity velocity V1_y in the Y-axis direction).

The yaw rate command setting section 32d receives, as the information indicating the positional relationship between the vehicle 1 and an obstacle, a distance d between the vehicle 1 and the obstacle and an azimuth $\phi$ indicating the direction of the vehicle 1 with respect to the obstacle, and additionally receives an estimated velocity Vb_estm1_x in the X-axis direction of the vehicle system overall center of gravity calculated in the center-of-gravity velocity estimator 33. The yaw rate command setting section 32d uses the input azimuth $\phi$, distance d, and estimated velocity Vb_estm1_x of the velocity Vb_x in the X-axis direction of the vehicle system overall center of gravity to perform the processing shown by the block-and-line diagram in FIG. 14, to thereby determine a yaw rate command $\omega$z_cmd.

Specifically, the yaw rate command setting section 32d performs, in a basic yaw rate setting section 32d1, processing of setting a basic yaw rate $\omega$z_cmd1, which is a basic value of the yaw rate command $\omega$z_cmd, according to the input azimuth $\phi$. In this case, the basic yaw rate setting section 32d1 sets the basic yaw rate $\omega$z_cmd1 on the basis of the azimuth $\phi$ input to the yaw rate command setting section 32d in accordance with a preset mapping or arithmetic expression, in a form indicated by the graph in FIG. 15A, for example. That is, the basic yaw rate $\omega$z_cmd1 is set to "0" in the case where the azimuth $\phi$ is within a range from a predetermined value $+\phi 1$, which is slightly greater than $+90°$, to $+180°$, or within a range from $-\phi 1$ to $-180°$.

In the case where the azimuth $\phi$ is within a range from a predetermined value $+\phi 2$, which is slightly greater than $0°$, to $+\phi 1$, the basic yaw rate $\omega$z_cmd1 is set so as to increase in the positive direction (the counterclockwise direction as seen from above) as the azimuth $\phi$ approaches $+\phi 2$. In the case where the azimuth $\phi$ is within a range from $-\phi 2$ to $-\phi 1$, the basic yaw rate $\omega$z_cmd1 is set so as to increase in the negative direction (the clockwise direction as seen from above) as the azimuth $\phi$ approaches $-\phi 2$.

Further, in the case where the azimuth is within a range from $-\phi 2$ to $+\phi 2$, the basic yaw rate $\omega$z_cmd1 is set so as to change continuously from a negative value corresponding to $-\phi 2$ to a positive value corresponding to $+\phi 2$. This is for preventing discontinuous changes of the basic yaw rate $\omega$z_cmd1 when the azimuth $\phi$ changes near zero.

Setting the basic yaw rate $\omega$z_cmd1 according to the azimuth $\phi$ in the above-described manner results in $\omega$z_cmd1 that is set such that an angular velocity in the direction causing the forward direction of the vehicle 1 to turn away from the obstacle is generated on the vehicle 1 within the range from $-\phi 1$ to $+\phi 1$.

The yaw rate command setting section 32d further performs, in a first restriction rate setting section 32d2, processing of setting the above-described first restriction rate $\beta$(d) on the basis of the input distance d, and also performs, in a velocity factor setting section 32d3, processing of setting a velocity factor k(Vb_x) on the basis of the input estimated velocity Vb_estm1_x. In this case, the processing performed by the first restriction rate setting section 32d2 is the same as the processing performed by the first restriction rate setting section 32c1 of the velocity restriction factor setting section 32c. Thus, with the distance d within the range from d1 to d3, the first restriction rate β(d) is set such that the rate of increase of the first restriction rate β(d) with respect to the decrease of the distance d decreases with decreasing distance d.

It should be noted that the pattern of change of the first restriction rate β(d) with respect to the distance d set by the yaw rate command setting section 32d does not have to be exactly the same as the pattern of change of the first restriction rate β(d) with respect to the distance d set by the velocity restriction factor setting section 32c. For example, the magnitude of the degree of increase of β(d) in the range from d1 to d3 or the like may differ in the first restriction rate β(d) set by the yaw rate command setting section 32d and the first restriction rate β(d) set by the velocity restriction factor setting section 32c.

The velocity factor k(Vb_x) takes a value within a range from "0" to "1". The velocity factor setting section 32d3 sets the velocity factor k(Vb_x) on the basis of the input estimated velocity Vb_estm1_x in accordance with a preset mapping or arithmetic expression, in a form indicated by the graph in FIG. 15B, for example.

Specifically, in the case where the estimated velocity Vb_estm1_x is not greater than a predetermined value V1, the velocity factor k(Vb_x) is set to "0". With Vb_estm1_x in a range from the predetermined value V1 to a predetermined value V2 (>V1), the velocity factor k(Vb_x) is set to increase from "0" to "1" with the increase of the estimated velocity Vb_estm1_x. With Vb_estm1_x of the predetermined value V2 or greater, the velocity factor k(Vb_x) is maintained at "1".

The yaw rate command setting section 32d performs, in a processing section 32d4, processing of multiplying the basic yaw rate ωz_cmd1 set according to the azimuth in the above-described manner, by the first restriction rate β(d) set according to the distance d and the velocity factor k(Vb_x) set according to the estimated velocity Vb_estm1_x, to thereby determine a yaw rate command ωz_cmd.

Returning to the description of FIG. 4, the desired center-of-gravity velocity determiner 32 performs, in a processing section 32e, processing of multiplying the yaw rate command ωz_cmd, determined in the above-described manner, by a distance L between the ground contact portion of the traveling motion unit 3 and the ground contact portion of the tail wheel 4 of the vehicle 1, to thereby calculate a velocity V4_y in the Y-axis direction of the vehicle system overall center of gravity (hereinafter, referred to as "yaw rate-adding velocity V4_y") that is necessary for causing a yaw rate corresponding to the yaw rate command ωz_cmd to be additionally generated on the vehicle 1.

Further, after determining the basic required center-of-gravity velocity V1_xy and the velocity restriction factor α_xy in the above-described manner, the desired center-of-gravity velocity determiner 32 performs, in a processing section 32f, processing of multiplying each component of V1_xy by the corresponding component of α_xy, to thereby calculate a first provisional desired center-of-gravity velocity V2_xy, which is a first provisional value of the desired center-of-gravity velocity Vb_cmd_xy. That is, the components of the first provisional desired center-of-gravity velocity V2_xy are calculated by the arithmetic operations of V2_x=V1_x·α_x and V2_y=V1_y·α_y.

Subsequently, the desired center-of-gravity velocity determiner 32 performs, in a processing section 32g, limiting processing on the first provisional desired center-of-gravity velocity V2_xy, to thereby determine a second provisional desired center-of-gravity velocity V3_xy, which is a second provisional value of the desired center-of-gravity velocity Vb_cmd_xy. The limiting processing performed by the processing section 32g is the processing of determining the second provisional desired center-of-gravity velocity V3_xy in such a manner that the rotational velocities of the electric motors 8a and 8b serving as the actuator 8 of the traveling motion unit 3 will not fall outside the predetermined permissible range and that the desired center-of-gravity velocity Vb_cmd_x in the X-axis direction is limited to within a range having zero or a predetermined negative value near zero as its lower limit.

In this limiting processing, in the case where the set of the first provisional desired center-of-gravity velocities V2_x, V2_y calculated by the processing section 32f is within a predetermined region on a coordinate system with the value of V2_x on the vertical axis and the value of V2_y on the horizontal axis, for example, then the first provisional desired center-of-gravity velocity V2_xy is determined as it is as the second provisional desired center-of-gravity velocity V3_xy.

In the case where the set of the first provisional desired center-of-gravity velocities V2_x, V2_y calculated by the processing section 32f falls outside the predetermined region on the coordinate system described above, then the velocity limited to the set of the values of V2_x, V2_y on the boundary of the predetermined region is set as the second provisional desired center-of-gravity velocity V3_xy.

Subsequently, the desired center-of-gravity velocity determiner 32 performs, in a processing section 32h, processing of adding the above-described yaw rate-adding velocity V4_y to the second provisional desired center-of-gravity velocity V3_xy, to thereby determine a desired center-of-gravity velocity Vb_cmd_xy. Specifically, the second provisional desired center-of-gravity velocity V3_x in the X-axis direction is determined as it is as the desired center-of-gravity velocity Vb_cmd_x in the X-axis direction, and the second provisional desired center-of-gravity velocity V3_y in the Y-axis direction with the yaw rate-adding velocity V4_y added thereto (=V3_y+V4_y) is determined to be the desired center-of-gravity velocity Vb_cmd_y in the Y-axis direction.

Supplementally, in the vehicle 1 according to the present embodiment, the processing performed by the velocity restriction factor setting section 32c, the yaw rate command setting section 32d, and the processing sections 32e, 32f, and 32h in the desired center-of-gravity velocity determiner 32 corresponds to the processing by the movement command correction unit in the present invention.

After performing the processing by the desired center-of-gravity velocity determiner 32 as described above, next, the movement control unit 21 performs the processing by the posture control arithmetic unit 34. The posture control arithmetic unit 34 determines a desired velocity Vw1_cmd_xy of the traveling motion unit 3, by the processing indicated by the block-and-line diagram in FIG. 4, so as to stabilize the postures of the boarding section 5 and the base body 2.

In more detail, the posture control arithmetic unit 34 firstly performs, in an arithmetic section 34a, processing of subtracting each component of the center-of-gravity displacement influence amount Vofs_xy from the corresponding component of the desired center-of-gravity velocity Vb_cmd_xy, to thereby determine a center-of-gravity displacement-compensated desired velocity Vb_cmpn_cmd_xy (a desired velocity obtained by compensating for the influence of the center-of-gravity displacement).

Subsequently, the posture control arithmetic unit 34 calculates a desired translational acceleration DVw1_cmd_x in the X-axis direction and a desired translational acceleration DVw1_cmd_y in the Y-axis direction of a desired translational acceleration DVw1_cmd_xy, which is a desired value of the translational acceleration of the ground contact point of the traveling motion unit 3, by the arithmetic operations of the following expressions (4a) and (4b), respectively. This arithmetic processing corresponds to the processing performed by the arithmetic sections included in the posture control arithmetic unit 34 shown in FIG. 4, excluding the above-described arithmetic section 34a and an integral calculation section 34b that performs an integral calculation.

$$DVw1\_cmd\_x = Kvb\_x \cdot (Vb\_cmpn\_cmd\_x - Vb\_estm1\_x) - Kth\_x \cdot \theta b\_act\_x - Kw\_x \cdot \omega b\_act\_x \quad (4a)$$

$$DVw1\_cmd\_y = Kvb\_y \cdot (Vb\_cmpn\_cmd\_y - Vb\_estm1\_y) - Kth\_y \cdot \theta b\_act\_y - Kw\_y \cdot \omega b\_act\_y \quad (4b)$$

In the expressions (4a) and (4b), Kvb_xy, Kth_xy, and Kw_xy are predetermined gain values set in advance. Further, the first term of the right side of the expression (4a) is a feedback manipulated variable component according to a difference between the center-of-gravity displacement-compensated desired velocity Vb_cmpn_cmd_x (a latest value) in the X-axis direction of the vehicle system overall center of gravity and the first estimated value Vb_estm1_x (a latest value) of the velocity of the vehicle system overall center of gravity, the second term is a feedback manipulated variable component according to a measurement value (a latest value) of the actual tilt angle θb_act_x in the direction about the Y-axis of the boarding section 5, and the third term is a feedback manipulated variable component according to a measurement value (a latest value) of the actual tilt angular velocity ωb_act_x in the direction about the Y-axis of the boarding section 5. The desired translational acceleration DVw1_cmd_x in the X-axis direction is calculated as a resultant manipulated variable of the above feedback manipulated variable components.

Similarly, the first term of the right side of the expression (4b) is a feedback manipulated variable component according to a difference between the center-of-gravity displacement-compensated desired velocity Vb_cmpn_cmd_y (a latest value) in the Y-axis direction of the vehicle system overall center of gravity and the first estimated value Vb_estm1_y (a latest value) of the velocity of the vehicle system overall center of gravity, the second term is a feedback manipulated variable component according to a measurement value (a latest value) of the actual tilt angle θb_act_y in the direction about the X-axis of the boarding section 5, and the third term is a feedback manipulated variable component according to a measurement value (a latest value) of the actual tilt angular velocity ωb_act_y in the direction about the X-axis of the boarding section 5. The desired translational acceleration DVw1_cmd_y in the Y-axis direction is calculated as a resultant manipulated variable of the above feedback manipulated variable components. It should be noted that the above expressions (4a) and (4b) can be rewritten to the following expressions (4a)' and (4b)', respectively.

$$DVw1\_cmd\_x = Kvb\_x \cdot (Vb\_cmd\_x - Vb\_estm1\_x) - Kth\_x \cdot (Ofst\_estm\_x/(h-r\_x) + \theta b\_act\_x) - Kw\_x \cdot \omega b\_act\_x \quad (4a)'$$

$$DVw1\_cmd\_y = Kvb\_y \cdot (Vb\_cmd\_y - Vb\_estm1\_y) - Kth\_y \cdot (Ofst\_estm\_y/(h-r\_y) + \theta b\_act\_y) - Kw\_y \cdot \omega b\_act\_y \quad (4b)'$$

In this case, the second term of the right side of the expressions (4a)' and (4b)' has the meaning as a feedback manipulated variable component for causing the actual position of the vehicle system overall center of gravity in the X-axis direction and in the Y-axis direction to become right above the ground contact portion of the traveling motion unit 3.

Subsequently, the posture control arithmetic unit 34 integrates the components of the desired translational acceleration DVw1_cmd_xy by the integral calculation section 34b, to thereby determine the desired velocity Vw1_cmd1_xy (a latest value) of the traveling motion unit 3.

The processing of determining the desired velocity Vw1_cmd1_xy of the traveling motion unit 3 by the movement control unit 21 is performed at each arithmetic processing cycle in the above-described manner. With this processing, the desired velocity Vw1_cmd1_xy of the traveling motion unit 3 is determined so as to be able to cause the moving velocity of the vehicle system overall center of gravity (the moving velocity in the horizontal direction) to converge to the desired center-of-gravity velocity Vb_cmd_xy while maintaining the postures of the boarding section 5 and the base body 2 of the vehicle 1 stable. The movement control unit 21 then performs feedback control of the electric motors 8a and 8b to cause the actual moving velocity of the traveling motion unit 3 to track the desired velocity Vw1_cmd_xy thus determined.

According to the embodiment described above, a basic required center-of-gravity velocity V1_xy, which is the basic value of the desired velocity of a representative point of the vehicle 1, is determined according to the basic velocity command Vjs_xy set in response to the operation of the joystick 12 serving as the operating device of the vehicle 1 and the center-of-gravity displacement influence amount Vofs_xy (or the center-of-gravity displacement amount Ofst_xy) associated with the movement of the operator's upper body (the weight shift). Basically, the basic required center-of-gravity velocity V1_xy is set as the desired center-of-gravity velocity Vb_cmd_xy, and the moving operation of the traveling motion unit 3 is controlled to realize the desired center-of-gravity velocity Vb_cmd_xy. This allows the operator to maneuver the vehicle 1 by one or both of the operation of the operating device (the operation of the joystick 12) and the movement, of the operator's upper body (the weight shift).

However, in the case where the distance d between the vehicle 1 and an obstacle becomes a predetermined value d1 or less, the velocity restriction factor α_yx and the yaw rate command ωz_cmd are set as described above. Then, the desired center-of-gravity velocity Vb_cmd_xy is restricted with respect to the basic required center-of-gravity velocity V1_xy in accordance with the velocity restriction factor α_xy, and a yaw rate-adding velocity V4_y, for causing a yaw rate of the yaw rate command ωz_cmd to be additionally generated on the vehicle 1, is added to the desired center-of-gravity velocity Vb_cmd_xy.

In this case, a first restriction rate β(d) for setting the velocity restriction factor α_xy is set in accordance with the distance d in the form as indicated by the graph in FIG. 9 as described above, so immediately after the distance d has become the predetermined value d1 or less, the first restriction rate β(d) increases promptly (and, hence, the X-axis direction component and the Y-axis direction component of the velocity restriction factor α_xy rapidly decrease).

Because of the above, each component of the desired center-of-gravity velocity Vb_cmd_xy is promptly restricted to the velocity having the absolute value smaller than the corresponding component of the basic required center-of-gravity velocity V1_xy. This makes it possible to rapidly reduce the velocity of the vehicle 1 immediately after the distance d has become the predetermined value d1 or less, to appropriately suppress further approach to the obstacle.

The velocity restriction factor α_xy is set in accordance with the distance d and the azimuth φ of the vehicle 1 with respect to the obstacle. This makes it possible to restrict the components of the desired center-of-gravity velocity Vb_cmd_xy with respect to the components of the basic required center-of-gravity velocity V1_xy in a manner appropriate to the distance d and the azimuth φ.

Further, the second restriction rate β(φ) which is set in accordance with the azimuth φ is set to a value "1" or close thereto in a wider range of the azimuth φ in the case where the distance d is smaller than the predetermined value d3 (i.e., when the vehicle 1 comes close to the obstacle), than in the case where the distance d is greater than the predetermined value d3. This enhances the effect of suppressing further approach of the vehicle 1 to the obstacle over a wide range of azimuth φ of the vehicle 1.

On the other hand, in the case where the distance d is greater than the predetermined value d3, the range of the azimuth φ in which the second restriction rate β(φ) is set to a value "1" or close thereto becomes smaller than in the case where the distance d is not greater than the predetermined value d3. This increases the degree of freedom in the direction in which the operator can move the vehicle 1.

Further, the first restriction rate β(d) for setting the yaw rate command ωz_cmd is set in accordance with the distance d in the form as indicated by the graph in FIG. 9 as described above, so immediately after the distance d becomes the predetermined value d1 or less, the magnitude of the yaw rate command ωz_cmd increases promptly in the direction in which the vehicle 1 roves away from the obstacle. Thus, movement control of the traveling motion unit 3 is performed in such a manner that a yaw rate in the direction causing the vehicle 1 to move away from the obstacle is additionally generated on the vehicle 1 immediately after the distance d has become the predetermined value d1 or less. This makes the vehicle 1 hardly approach the obstacle, thereby appropriately suppressing further approach to the obstacle.

The yaw rate command ωz_cmd is set in accordance with the estimated velocity Vb_estm1_x of the vehicle system overall center of gravity in the X-axis direction (the velocity of the representative point of the vehicle 1) in addition to the distance d and the azimuth φ. Accordingly, for various operational states of the vehicle 1 as it approaches an obstacle, a yaw rate command ωz_cmd that is suitable in suppressing further approach to the obstacle can be set to control the movement of the vehicle 1.

Furthermore, in the above-described embodiment, in the case where the distance d becomes the predetermined value d1 or less, the velocity of the vehicle system overall center of gravity is restricted promptly, and movement control of the traveling motion unit 3 is also performed so as to cause a yaw rate of the yaw rate command ωz_cmd to be rapidly generated additionally on the vehicle 1, as described above. This allows an operator to quickly and sensitively recognize that the vehicle 1 has come too close to the obstacle, irrespective of whether the obstacle is a real one or a virtual one. Accordingly, the operator is able to appropriately maneuver and move the vehicle 1 so as to prevent the vehicle 1 from coming too close to the obstacle.

The present invention is not limited to the embodiment described above. Some other embodiments will be described below. In the above embodiment, the basic required center-of-gravity velocity V1_xy serving as a basis of the desired center-of-gravity velocity Vb_cmd_xy is set in response to the operation of the operating device by the operator (the operation of the joystick 12) and the movement of the operator's upper body (the weight shift). Alternatively, the basic required center-of-gravity velocity V1_xy may be set in response only to either the operation of the operating device by the operator (the operation of the joystick 12) or the movement of the operator's upper body (the weight shift).

Further, in the above embodiment, the first restriction rate β(d) according to the distance d between the vehicle 1 and the obstacle and the second restriction rate β(φ) according to the azimuth φ of the vehicle 1 with respect to the obstacle were determined separately, and they were integrated to determine the resultant restriction rate (the provisional resultant restriction rate) β1_xy. Alternatively, for example, a mapping or the like may be used to determine the resultant restriction rates β1_x and β1_y (or 1−β1_x and 1−β1_y) directly from the distance d and the azimuth φ.

In the above embodiment, the vehicle system overall center of gravity was used as the representative point of the vehicle 1. Alternatively, the representative point may be a representative point of the traveling motion unit 3, for example. Further, in the above embodiment, an inverted pendulum type vehicle 1 was given as an example of the mobile body. Alternatively, the mobile body according to the present invention may be an electric wheelchair, an electric cart, or other mobile body. Still alternatively, the mobile body may be a mobile body of a type with no operator boarding thereon (a mobile body remotely controlled by an operator). The boarding section of the mobile body is not limited to the one on which the operator can be seated. The boarding section may be configured, for example, such that the operator can board it in a standing position.

What is claimed is:

1. A control device for a mobile body which moves in accordance with a maneuvering operation by an operator, the device comprising:
a basic movement command generation unit configured to generate a basic movement command which is a movement command for the mobile body based on the maneuvering operation by the operator;
a movement command correction unit configured to correct the basic movement command according to a positional relationship between the mobile body and an obstacle present or set up in a moving environment of the mobile body; and
a movement control unit configured to perform movement control of the mobile body according to a corrected movement command which is the basic movement command corrected by the movement command correction unit; wherein
the movement command correction unit is configured to correct the basic movement command, in a case where a distance between the obstacle and the mobile body has become a first predetermined value or less, so as to cause a yaw rate in a direction away from the obstacle to be additionally generated on the mobile body, and configured to correct the basic movement command so as to cause a rate of increase in magnitude of the yaw rate with respect to a decrease of the distance between the obstacle and the mobile body, to be increased as the distance between the obstacle and the mobile body increases.

2. The control device for the mobile body according to claim 1, wherein
the movement command correction unit is configured to correct the basic movement command in such a manner that the yaw rate additionally generated on the mobile body changes according to the distance, a direction of the mobile body with respect to the obstacle, and a moving velocity of the mobile body.

3. The control device for the mobile body according to claim 1, wherein
the movement command correction unit is further configured to correct the basic movement command, in the case where the distance has become the first predetermined value or less, in such a manner that a moving velocity of a representative point of the mobile body is limited to a moving velocity having an absolute value smaller than a basic moving velocity which is a moving velocity defined according to the basic movement command, and configured to correct the basic movement command so as to cause a rate of increase in degree of restriction of the moving velocity with respect to a decrease of the distance, to be increased as the distance is closer to the first predetermined value.

4. The control device for the mobile body according to claim 3, wherein
the movement command correction unit is configured, in the case where the distance has become the first predetermined value or less, to perform processing of setting a first restriction degree index value indicating the degree of restriction of the moving velocity according to the distance and processing of setting a second restriction degree index value indicating the degree of restriction of the moving velocity according to a direction of the mobile body with respect to the obstacle, and restrict the moving velocity of the representative point of the mobile body in accordance with the first restriction degree index value and the second restriction degree index value, and
the movement command correction unit is also configured, in a case where the degree of restriction indicated by the second restriction degree index value which is set in a case where the distance is not greater than a second predetermined value which is smaller than the first predetermined value is defined as a degree A restriction and the degree of restriction indicated by the second restriction degree index value which is set in a case where the distance is greater than the second predetermined value is defined as a degree B restriction, to set the second restriction degree index value so as to cause the degree A restriction becomes greater than the degree B restriction in at least a part of a variable range of the direction of the mobile body.

5. The control device for the mobile body according to claim 1, wherein
the mobile body is a boarding-type mobile body having a boarding section on which the operator boards.

6. A control device for a mobile body which moves in accordance with a maneuvering operation by an operator, the device comprising:
a basic movement command generation unit configured to generate a basic movement command which is a movement command for the mobile body based on the maneuvering operation by the operator;
a movement command correction unit configured to correct the basic movement command according to a positional relationship between the mobile body and an obstacle present or set up in a moving environment of the mobile body; and
a movement control unit configured to perform movement control of the mobile body according to a corrected movement command which is the basic movement command corrected; wherein
the movement command correction unit is configured to correct the basic movement command, in a case where a distance between the obstacle and the mobile body has become a first predetermined value or less, so as to restrict a moving velocity of a representative point of the mobile body to a moving velocity having an absolute value smaller than a basic moving velocity which is a moving velocity defined according to the basic movement command, and configured to correct the basic movement command so as to cause a rate of increase in degree of restriction of the moving velocity with respect to a decrease of the distance between the obstacle and the mobile body, to be increased as the distance between the obstacle and the mobile body increases.

7. The control device for the mobile body according to claim 6, wherein
the movement command correction unit is configured, in the case where the distance has become the first predetermined value or less, to perform processing of setting a first restriction degree index value indicating the degree of restriction of the moving velocity according to the distance and processing of setting a second restriction degree index value indicating the degree of restriction of the moving velocity according to a direction of the mobile body with respect to the obstacle, and restrict the moving velocity of the representative point of the mobile body in accordance with the first restriction degree index value and the second restriction degree index value, and
the movement command correction unit is also configured, in a case where the degree of restriction indicated by the second restriction degree index value which is set in a case where the distance is not greater than a second predetermined value which is smaller than the first predetermined value is defined as a degree A restriction and the degree of restriction indicated by the second restriction degree index value which is set in a case where the distance is greater than the second predetermined value is defined as a degree B restriction, to set the second restriction degree index value so as to cause the degree A restriction becomes greater than the degree B restriction in at least a part of a variable range of the direction of the mobile body.

8. The control device for the mobile body according to claim 6, wherein
the mobile body is a boarding-type mobile body having a boarding section on which the operator boards.

* * * * *